US012606972B2

(12) United States Patent
Cors

(10) Patent No.: US 12,606,972 B2
(45) Date of Patent: Apr. 21, 2026

(54) VARIABLE MOMENT VIBRATORY SYSTEMS AND METHODS

(71) Applicant: American Piledriving Equipment, Inc., Kent, WA (US)

(72) Inventor: Gerald Cors, Enumclaw, WA (US)

(73) Assignee: American Piledriving Equipment, Inc., Kent, WA (US)

( * ) Notice: Subject to any disclaimer, the term of this patent is extended or adjusted under 35 U.S.C. 154(b) by 0 days.

(21) Appl. No.: 19/045,907

(22) Filed: Feb. 5, 2025

(65) Prior Publication Data

US 2025/0250760 A1 Aug. 7, 2025

Related U.S. Application Data

(60) Provisional application No. 63/550,796, filed on Feb. 7, 2024.

(51) Int. Cl.
*E02D 7/18* (2006.01)
*B06B 1/16* (2006.01)

(52) U.S. Cl.
CPC ................ *E02D 7/18* (2013.01); *B06B 1/165* (2013.01)

(58) Field of Classification Search
CPC .................................. E02D 7/18; B06B 1/165
See application file for complete search history.

(56) References Cited

U.S. PATENT DOCUMENTS

| | | | |
|---|---|---|---|
| 5,015 | A | 3/1847 | Ingalls |
| 48,515 | A | 7/1865 | Campbell et al. |
| 369,176 | A | 8/1887 | Gerstein |
| 400,209 | A | 3/1889 | Haskins |
| 500,780 | A | 7/1893 | Simon |
| 628,962 | A | 7/1899 | Speer |

(Continued)

FOREIGN PATENT DOCUMENTS

| | | | |
|---|---|---|---|
| CA | 2394894 | A1 | 8/2003 |
| CA | 2942801 | A1 | 10/2015 |

(Continued)

OTHER PUBLICATIONS

"Castle Board Drain Method", Japanese brochure, Reference Nos. APE00857 through APE00863, Aug. 1976.

(Continued)

*Primary Examiner* — Nathaniel C Chukwurah
(74) *Attorney, Agent, or Firm* — Michael R. Schacht; Schacht Law Office, Inc.

(57) ABSTRACT

A coupler system for a vibratory system comprising an eccentric system comprising at least one transfer gear operatively connected to at least upper and lower eccentric members, the coupler system comprising a coupler housing defining a coupler axis, at least one drive rack supported for linear movement within the coupler housing, a coupler drive system for causing linear movement of the at least one drive rack within the coupler housing, at least one coupler gear adapted to engage the at least one transfer gear, and at least one pinion assembly operatively connected between the at least one drive rack and the at least one coupler gear. Linear movement of the at least one drive rack causes rotation of the at least one coupler gear around the coupler axis to alter an angular relationship of the upper and lower eccentric members.

16 Claims, 15 Drawing Sheets

(56) References Cited

U.S. PATENT DOCUMENTS 696,480 A 4/1902 Pierce
870,762 A 11/1907 Burge
910,421 A 1/1909 Schlueter
999,334 A 8/1911 Robert
1,103,104 A 7/1914 Tismer
1,128,808 A 2/1915 Manoogian
1,159,303 A 11/1915 Waugh
1,213,800 A 1/1917 Piper
1,288,989 A 12/1918 Rees
1,294,154 A 2/1919 Payne
1,322,470 A 11/1919 Schenk
1,348,994 A 8/1920 Heckle
1,464,231 A 8/1923 Yezek
1,654,093 A 12/1927 Reid
1,684,816 A 9/1928 Arden
1,702,349 A 2/1929 Krell
1,748,555 A 2/1930 Kinney
1,762,037 A 6/1930 Taylor
1,769,169 A 7/1930 Thornley
1,787,000 A 12/1930 Hunt
1,903,555 A 4/1933 Robertson
1,914,899 A 6/1933 Syme
1,988,173 A 1/1935 Kersting
2,068,045 A 1/1937 Wohlmeyer
2,101,285 A 12/1937 Stevens
2,128,428 A 8/1938 Murray, Jr.
2,232,845 A 2/1941 Fieroh
2,239,024 A 4/1941 Vance
2,345,795 A 4/1944 Curtis
2,350,921 A 6/1944 Pinazza
2,436,251 A 2/1948 Dobie et al.
2,439,219 A 4/1948 O'Connor
2,577,252 A 12/1951 Kjellman
2,723,532 A 11/1955 Smith
2,755,783 A 7/1956 Kupka
2,760,747 A 8/1956 Mordarski
2,804,856 A 9/1957 Spurlin
2,842,972 A 7/1958 Houdart
2,859,628 A 11/1958 Arko
2,882,690 A 4/1959 Frederick
2,904,964 A 9/1959 Kupka
2,952,132 A 9/1960 Urban
2,975,846 A 3/1961 Bodine
3,001,515 A 9/1961 Haage
3,004,389 A 10/1961 Muller
3,034,304 A 5/1962 Upson
3,059,436 A 10/1962 Hermann, Jr.
3,094,007 A 6/1963 Luhrs
3,100,382 A 8/1963 Muller
3,101,552 A 8/1963 Tandler
3,106,258 A 10/1963 Muller
3,108,503 A 10/1963 Murek
3,115,198 A 12/1963 Kuss
3,149,851 A 9/1964 Adams
3,172,485 A 3/1965 Spannhake et al.
3,175,630 A 3/1965 Hein et al.
3,177,029 A 4/1965 Larson
3,193,026 A 7/1965 Kupka
3,227,483 A 1/1966 Guild et al.
3,243,190 A 3/1966 Peregrine
3,267,677 A 8/1966 Bollar
3,278,235 A 10/1966 Bergstrom
3,280,924 A 10/1966 Tatarnikov
3,287,983 A 11/1966 Austin et al.
3,289,774 A 12/1966 Bodine, Jr.
3,300,987 A 1/1967 Maeda
3,313,376 A 4/1967 Holland
3,371,727 A 3/1968 Belousov et al.
3,375,881 A 4/1968 Myers et al.
3,381,422 A 5/1968 Olson
3,391,435 A 7/1968 Lebelle
3,394,766 A 7/1968 Lebelle
3,396,805 A 8/1968 Muller
3,411,305 A 11/1968 Cella
3,412,813 A 11/1968 Johnson
3,433,311 A * 3/1969 Lebelle .................. E02D 11/00
74/61
3,447,423 A 6/1969 Henry
3,450,398 A 6/1969 Barnes
3,460,637 A 8/1969 Schulin
3,513,587 A 5/1970 Artur
3,528,302 A 9/1970 Kinnan
3,530,947 A 9/1970 Gendron
3,577,645 A 5/1971 Zurawski
3,583,497 A 6/1971 Kossowski et al.
3,616,453 A 10/1971 Philpot
3,620,137 A 11/1971 Prasse
3,638,738 A 2/1972 Varnell
3,679,005 A 7/1972 Inaba et al.
3,684,037 A 8/1972 Bodine
3,686,877 A 8/1972 Bodin
3,711,161 A 1/1973 Proctor et al.
3,720,435 A 3/1973 Leyn
3,734,209 A 5/1973 Haisch et al.
3,786,874 A 1/1974 Demichelis et al.
3,786,878 A 1/1974 Sherman
3,789,930 A 2/1974 Nishimura et al.
3,797,585 A 3/1974 Ludvigson
3,808,820 A 5/1974 Bodine
3,822,969 A 7/1974 Kummel
3,828,864 A 8/1974 Haverkamp et al.
3,854,418 A 12/1974 Bertin
3,861,664 A 1/1975 Durkee
3,865,501 A 2/1975 Kniep
3,871,617 A 3/1975 Majima
3,874,244 A 4/1975 Rasmussen et al.
3,891,186 A 6/1975 Thorsell
3,907,042 A 9/1975 Halwas et al.
3,909,149 A 9/1975 Century
3,952,796 A 4/1976 Larson
3,959,557 A 5/1976 Berry
3,967,688 A 7/1976 Inenaga et al.
3,975,918 A 8/1976 Jansz
3,991,833 A 11/1976 Ruppert
3,998,063 A 12/1976 Harders
3,999,392 A 12/1976 Fukushima et al.
4,018,290 A 4/1977 Schmidt
4,029,158 A 6/1977 Gerrish
4,033,419 A 7/1977 Pennington
4,067,369 A 1/1978 Harmon
4,076,081 A 2/1978 Schnell
4,082,361 A 4/1978 Lanfermann
4,099,387 A 7/1978 Frederick et al.
4,100,974 A 7/1978 Pepe
4,102,408 A 7/1978 Ludvigson
4,109,475 A 8/1978 Schnell
4,113,034 A * 9/1978 Carlson .................... E02D 7/18
74/61
4,119,159 A 10/1978 Arentsen
4,143,985 A 3/1979 Axelsson et al.
4,144,939 A 3/1979 Knothe
4,154,307 A 5/1979 Gendron et al.
4,155,600 A 5/1979 Lanfermann et al.
4,166,508 A 9/1979 van den Berg
4,180,047 A 12/1979 Bertelson
4,187,917 A 2/1980 Bouyoucos
4,195,698 A 4/1980 Nakagawasai
4,248,550 A 2/1981 Blaschke et al.
4,262,755 A 4/1981 Kuhn
4,274,761 A 6/1981 Boguth
4,285,405 A 8/1981 Weir
4,297,056 A 10/1981 Nottingham
4,312,413 A 1/1982 Loftis
4,351,624 A 9/1982 Barber
4,362,216 A 12/1982 Jansz
4,366,870 A 1/1983 Frederick
4,367,800 A 1/1983 Arentsen
4,375,927 A 3/1983 Kniep
4,380,918 A 4/1983 Killop
4,382,475 A 5/1983 Suzuki
4,397,199 A 8/1983 Jahn
4,421,180 A 12/1983 Fleishman et al.
4,428,699 A 1/1984 Juhola
4,430,024 A 2/1984 Guild et al.

(56) References Cited

U.S. PATENT DOCUMENTS

| | | | |
|---|---|---|---|
| 4,436,452 | A | 3/1984 | Bodine |
| 4,455,105 | A | 6/1984 | Juhola |
| 4,465,145 | A | 8/1984 | Kuhn |
| 4,473,123 | A | 9/1984 | Ranft et al. |
| 4,484,638 | A | 11/1984 | West |
| 4,497,376 | A | 2/1985 | Kurylko |
| 4,497,377 | A | 2/1985 | Haytayan |
| 4,505,614 | A | 3/1985 | Anschutz |
| 4,519,729 | A | 5/1985 | Clarke et al. |
| 4,522,304 | A | 6/1985 | Walter |
| 4,537,527 | A | 8/1985 | Juhola et al. |
| 4,547,110 | A | 10/1985 | Davidson |
| 4,553,443 | A | 11/1985 | Rossfelder et al. |
| 4,601,615 | A | 7/1986 | Cavalli |
| 4,603,748 | A | 8/1986 | Rossfelder et al. |
| 4,606,427 | A | 8/1986 | Beer |
| 4,616,716 | A | 10/1986 | Bouplon |
| 4,624,325 | A | 11/1986 | Steiner |
| 4,625,811 | A | 12/1986 | Tuenkers |
| 4,626,138 | A | 12/1986 | Boyes |
| 4,627,768 | A | 12/1986 | Thomas et al. |
| 4,632,602 | A | 12/1986 | Hovnanian |
| 4,637,475 | A | 1/1987 | England et al. |
| 4,645,017 | A | 2/1987 | Bodine |
| 4,650,008 | A | 3/1987 | Simson |
| 4,687,026 | A | 8/1987 | Westman |
| 4,725,167 | A | 2/1988 | Merjan |
| 4,735,270 | A | 4/1988 | Fenyvesi |
| 4,755,080 | A | 7/1988 | Cortlever et al. |
| 4,757,809 | A | 7/1988 | Koeneman et al. |
| 4,758,148 | A | 7/1988 | Jidell |
| 4,768,900 | A | 9/1988 | Burland |
| 4,799,557 | A | 1/1989 | Jacquemet |
| 4,813,814 | A | 3/1989 | Shibuta et al. |
| 4,819,740 | A | 4/1989 | Warrington |
| 4,844,661 | A | 7/1989 | Martin et al. |
| 4,863,312 | A | 9/1989 | Cavalli |
| 4,877,353 | A | 10/1989 | Wisotsky |
| 4,915,180 | A | 4/1990 | Schisler |
| 4,961,471 | A | 10/1990 | Ovens |
| 4,974,997 | A | 12/1990 | Sero et al. |
| 4,989,677 | A | 2/1991 | Lam |
| 4,993,500 | A | 2/1991 | Greene et al. |
| 5,004,055 | A | 4/1991 | Porritt et al. |
| 5,018,251 | A | 5/1991 | Brown |
| 5,018,905 | A | 5/1991 | Kinder |
| 5,076,090 | A | 12/1991 | Cetnarowski |
| 5,088,565 | A | 2/1992 | Evarts |
| 5,106,233 | A | 4/1992 | Breaux |
| 5,107,934 | A | 4/1992 | Atchison |
| 5,117,925 | A | 6/1992 | White |
| 5,154,667 | A | 10/1992 | Mauch et al. |
| 5,161,625 | A | 11/1992 | Seng |
| 5,213,449 | A | 5/1993 | Morris |
| 5,240,348 | A | 8/1993 | Breaux |
| 5,244,316 | A | 9/1993 | Wright et al. |
| 5,253,542 | A | 10/1993 | Houze |
| RE34,460 | E | 11/1993 | Ishiguro et al. |
| 5,263,544 | A | 11/1993 | White |
| 5,281,775 | A | 1/1994 | Gremillion |
| 5,343,002 | A | 8/1994 | Gremillion |
| 5,355,964 | A | 10/1994 | White |
| 5,375,897 | A | 12/1994 | Gazel-Anthoine |
| 5,385,218 | A | 1/1995 | Migliori |
| 5,388,931 | A | 2/1995 | Carlson |
| 5,409,070 | A | 4/1995 | Roussy |
| 5,410,879 | A | 5/1995 | Houze |
| 5,423,633 | A | 6/1995 | Verstraeten |
| 5,439,326 | A | 8/1995 | Goughnour et al. |
| 5,526,885 | A | 6/1996 | Kuvshinov et al. |
| 5,529,132 | A | 6/1996 | Evarts |
| 5,540,193 | A | 7/1996 | Achten et al. |
| 5,540,295 | A | 7/1996 | Serrette |
| 5,544,979 | A | 8/1996 | White |
| 5,549,168 | A | 8/1996 | Sadler et al. |
| 5,549,170 | A | 8/1996 | Barrow |
| 5,551,804 | A | 9/1996 | Breaux et al. |
| 5,562,169 | A | 10/1996 | Barrow |
| 5,609,380 | A | 3/1997 | White |
| 5,653,556 | A | 8/1997 | White |
| 5,658,091 | A | 8/1997 | Goughnour et al. |
| 5,727,639 | A | 3/1998 | Jeter |
| 5,788,419 | A | 8/1998 | Whitty, Jr. et al. |
| 5,794,716 | A | 8/1998 | White |
| 5,800,096 | A | 9/1998 | Barrow |
| 5,806,610 | A | 9/1998 | Sapozhnikov |
| 5,811,741 | A | 9/1998 | Coast et al. |
| 5,836,205 | A | 11/1998 | Meyer |
| 5,860,482 | A | 1/1999 | Gremillion et al. |
| 5,918,511 | A | 7/1999 | Sabbaghian et al. |
| 5,924,498 | A | 7/1999 | Nilsen |
| 5,934,835 | A | 8/1999 | Whitty, Jr. et al. |
| 6,003,619 | A | 12/1999 | Lange |
| 6,039,508 | A | 3/2000 | White |
| 6,056,070 | A | 5/2000 | Shinohara et al. |
| 6,102,133 | A | 8/2000 | Scheid et al. |
| 6,129,159 | A | 10/2000 | Scott et al. |
| 6,129,487 | A | 10/2000 | Bermingham et al. |
| 6,135,214 | A | 10/2000 | Last |
| 6,155,353 | A | 12/2000 | Ottestad |
| 6,179,527 | B1 | 1/2001 | Goughnour |
| 6,186,043 | B1 | 2/2001 | Callies |
| 6,216,394 | B1 | 4/2001 | Fenelon |
| 6,224,294 | B1 | 5/2001 | Mansfield |
| 6,227,767 | B1 | 5/2001 | Mosing et al. |
| 6,234,260 | B1 | 5/2001 | Coast et al. |
| 6,250,426 | B1 | 6/2001 | Lombard |
| 6,360,829 | B1 | 3/2002 | Naber et al. |
| 6,364,577 | B1 | 4/2002 | Haney |
| 6,378,951 | B1 | 4/2002 | Bouyoucos et al. |
| 6,386,295 | B1 | 5/2002 | Suver |
| 6,394,704 | B1 | 5/2002 | Saeki et al. |
| 6,427,402 | B1 | 8/2002 | White |
| 6,431,795 | B2 | 8/2002 | White |
| 6,447,036 | B1 | 9/2002 | White |
| 6,484,553 | B1 | 11/2002 | Devers |
| 6,543,966 | B2 | 4/2003 | White |
| 6,557,647 | B2 | 5/2003 | White |
| 6,582,158 | B1 | 6/2003 | Van Stein |
| 6,604,583 | B1 * | 8/2003 | Van Randen ............. E02D 7/18 173/1 |
| 6,648,556 | B1 | 11/2003 | White |
| 6,652,194 | B2 | 11/2003 | Ingle |
| 6,672,805 | B1 | 1/2004 | White |
| 6,691,797 | B1 | 2/2004 | Hart |
| 6,732,483 | B1 | 5/2004 | White |
| 6,736,218 | B1 | 5/2004 | White |
| 6,752,043 | B2 | 6/2004 | Carlson |
| 6,860,338 | B2 | 3/2005 | Salesse et al. |
| 6,896,448 | B1 | 5/2005 | White |
| 6,908,262 | B1 | 6/2005 | White |
| 6,938,704 | B2 | 9/2005 | Berger et al. |
| 6,942,430 | B1 | 9/2005 | Suver |
| 6,988,564 | B2 | 1/2006 | White |
| 7,011,156 | B2 | 3/2006 | Gynz-Rekowski |
| 7,043,806 | B2 | 5/2006 | Schrock et al. |
| 7,080,958 | B1 | 7/2006 | Morris |
| 7,156,190 | B2 | 1/2007 | Ottestad et al. |
| 7,168,890 | B1 | 1/2007 | Evarts |
| 7,392,855 | B1 | 7/2008 | White |
| 7,404,449 | B2 | 7/2008 | Bermingham et al. |
| 7,407,343 | B2 | 8/2008 | van Halteren et al. |
| 7,591,612 | B2 | 9/2009 | Wong |
| 7,694,747 | B1 | 4/2010 | White |
| 7,708,499 | B1 | 5/2010 | Evarts et al. |
| 7,726,913 | B1 | 6/2010 | Sjogren |
| 7,824,132 | B1 | 11/2010 | White |
| 7,854,571 | B1 | 12/2010 | Evarts |
| 7,914,236 | B2 | 3/2011 | Neville |
| 7,950,877 | B2 | 5/2011 | Evarts |
| 7,972,083 | B2 | 7/2011 | Jones |
| 8,070,391 | B2 | 12/2011 | White |
| 8,181,713 | B2 | 5/2012 | White |
| 8,181,716 | B2 | 5/2012 | Robson |

(56) References Cited

U.S. PATENT DOCUMENTS

| | | | |
|---|---|---|---|
| 8,186,452 | B1 | 5/2012 | White et al. |
| 8,434,969 | B2 | 5/2013 | White |
| 8,496,072 | B2 | 7/2013 | White |
| 8,763,719 | B2 | 7/2014 | White |
| 9,249,551 | B1 | 2/2016 | White |
| 9,255,375 | B2 | 2/2016 | Yingling et al. |
| 9,278,443 | B2 | 3/2016 | Robson |
| 9,371,624 | B2 | 6/2016 | Suver et al. |
| 9,611,610 | B2 | 4/2017 | Suver |
| 9,873,997 | B2 | 1/2018 | Van Es |
| 9,957,684 | B2 | 5/2018 | Suver et al. |
| 10,273,646 | B2 | 4/2019 | Cress |
| 10,538,892 | B2 | 1/2020 | Cress et al. |
| 12,129,623 | B2 | 10/2024 | Miller et al. |
| 2001/0002230 | A1 | 5/2001 | White |
| 2002/0139550 | A1 | 10/2002 | Mewes |
| 2003/0143036 | A1 | 7/2003 | Larsen et al. |
| 2005/0013675 | A1 | 1/2005 | Bengston et al. |
| 2005/0039952 | A1 | 2/2005 | Hill et al. |
| 2005/0232708 | A1 | 10/2005 | White |
| 2006/0052818 | A1 | 3/2006 | Drake et al. |
| 2006/0113456 | A1 | 6/2006 | Miller |
| 2006/0198706 | A1 | 9/2006 | Neville |
| 2006/0216118 | A1 | 9/2006 | Wong et al. |
| 2008/0310923 | A1 | 12/2008 | Jinnings et al. |
| 2009/0129870 | A1 | 5/2009 | Jones |
| 2010/0266344 | A1 | 10/2010 | Plotkin et al. |
| 2010/0303552 | A1 | 12/2010 | Yingling et al. |
| 2011/0162859 | A1 | 7/2011 | White |
| 2011/0243668 | A1 | 10/2011 | White |
| 2011/0252610 | A1 | 10/2011 | Evarts |
| 2012/0114424 | A1 | 5/2012 | White |
| 2012/0292062 | A1 | 11/2012 | White |
| 2013/0149040 | A1 | 6/2013 | Evarts |
| 2014/0056652 | A1 | 2/2014 | Suver |
| 2014/0231115 | A1 | 8/2014 | Heichel |
| 2014/0377011 | A1 | 12/2014 | Yingling et al. |
| 2015/0016893 | A1 | 1/2015 | Suver et al. |
| 2015/0211201 | A1 | 7/2015 | Van Es |
| 2016/0356294 | A1 | 12/2016 | Fenwick et al. |
| 2017/0101759 | A1 | 4/2017 | Suver |
| 2017/0138133 | A1 | 5/2017 | Fenwick |
| 2017/0167102 | A1 | 6/2017 | Suver et al. |
| 2017/0167104 | A1 | 6/2017 | Cress |
| 2018/0002886 | A1 | 1/2018 | Cress et al. |
| 2022/0316168 | A1 | 10/2022 | Miller et al. |

FOREIGN PATENT DOCUMENTS

| | | | |
|---|---|---|---|
| CN | 2538852 | Y | 3/2003 |
| CN | 101182714 | A | 5/2008 |
| CN | 102296608 | B | 12/2011 |
| CN | 107558472 | A | 1/2018 |
| CN | 115142413 | A | 10/2022 |
| DE | 2526889 | A1 | 1/1976 |
| DE | 4010357 | A1 | 10/1990 |
| DE | 4414190 | C1 | 7/1995 |
| DE | 10356319 | A1 | 6/2005 |
| DE | 102006053482 | A1 | 6/2008 |
| DE | 112012000913 | T5 | 11/2013 |
| EP | 0172960 | A1 | 3/1986 |
| EP | 362158 | A2 | 4/1990 |
| EP | 526743 | B1 | 8/1995 |
| EP | 1686215 | A2 | 8/2006 |
| EP | 2904154 | A1 | 8/2015 |
| EP | 2951353 | A1 | 12/2015 |
| FR | 838717 | A | 3/1939 |
| FR | 2560247 | A1 | 8/1985 |
| GB | 529328 | A | 11/1940 |
| GB | 1066727 | A | 4/1967 |
| GB | 2003769 | A | 3/1979 |
| GB | 2023496 | A | 1/1980 |
| GB | 2028902 | A | 3/1980 |
| GB | 2043755 | A | 10/1980 |
| GB | 2060742 | A | 5/1981 |
| GB | 2069659 | A | 8/1981 |
| JP | 5494703 | | 7/1979 |
| JP | 355098526 | | 7/1980 |
| JP | S5598526 | A | 7/1980 |
| JP | 356034828 | | 4/1981 |
| JP | S5634828 | A | 4/1981 |
| JP | 57169130 | | 10/1982 |
| JP | S57169130 | A | 10/1982 |
| JP | 59228529 | A | 12/1984 |
| JP | 61221416 | | 10/1986 |
| JP | HEI258627 | | 2/1990 |
| JP | 497015 | A | 3/1992 |
| JP | 473035 | | 6/1992 |
| JP | 5246681 | | 9/1993 |
| JP | 6136751 | | 5/1994 |
| JP | 9328983 | A | 12/1997 |
| JP | 2005256500 | A | 9/2005 |
| JP | 2005315050 | A | 11/2005 |
| JP | 2006089933 | A | 4/2006 |
| JP | 2006177125 | A | 7/2006 |
| JP | 2006312825 | A | 11/2006 |
| JP | 2009138487 | A | 6/2009 |
| KR | 1020010044658 | A | 5/2001 |
| KR | 1020030017742 | A | 4/2003 |
| NL | 42349 | C | 1/1938 |
| NL | 65252 | C | 2/1950 |
| NL | 7710385 | A | 3/1978 |
| NL | 7707303 | A | 1/1979 |
| NL | 7805153 | A | 11/1979 |
| NL | 9401403 | A | 4/1996 |
| NL | 2002804 | | 10/2010 |
| NL | 2005087 | | 1/2012 |
| NL | 2006722 | | 11/2012 |
| NL | 2010487 | | 9/2014 |
| NL | 2012101 | | 7/2015 |
| NL | 2016646 | A | 10/2017 |
| NL | 2017152 | B | 1/2018 |
| NL | 2017186 | B | 1/2018 |
| NL | 2018132 | B | 7/2018 |
| NL | 2030443 | B | 7/2023 |
| NO | 46428 | A | 4/1929 |
| RU | 2109881 | C1 | 4/1998 |
| SU | 1027357 | A1 | 7/1983 |
| WO | 8707673 | A1 | 12/1987 |
| WO | WO8707673 | | 12/1987 |
| WO | 8805843 | A1 | 8/1988 |
| WO | WO8805843 | | 8/1988 |
| WO | 9600326 | A1 | 1/1996 |
| WO | 2012031108 | A1 | 3/2012 |
| WO | 2014054942 | A1 | 4/2014 |
| WO | 2014119995 | A1 | 8/2014 |
| WO | 2023131623 | A1 | 7/2023 |

OTHER PUBLICATIONS

"Kony Drain Board," undated, 1 page.

"The 1.sup.st Report on the Treatment of Soft Foundation of Juck Hyun Industrial Site", Ref. Nos. APE00854 through APE00856, Mar. 1976.

A report identifying systems for driving mandrels carrying wick drain material into the earth, identified by Ref. Nos. APE0510 through APE0536, (undated).

A series of photographs identified by reference Nos. APE01147 through APE01159. 1990-1993.

American Piledriving Equipment Inc., What is a Variable Moment Driver/Extractor and How Does it Work?, undated, 1 page.

American Piledriving Equipment Inc.; Hydraulic impact Hammer Owner's Manual Deep Foundation Solutions, Model 20-5 HIH; Copyright 2022 American Piledriving Equipment Inc., Kent, Washington; 38 pages.

American Piledriving Equipment, APE Model 10-4 Hydraulic Impact Hammer, 1 page, https://www.americanpiledriving.com/ver2/MvcSpecifications/Hih/Display/2.

American Piledriving Equipment, Inc., A series of photographs identified by Reference Nos. APE01147-APE01159, undated, 13 pages.

APE, "APE Model 8 Hydraulic Impact Hammer," 2000, 1 page.

(56) References Cited

OTHER PUBLICATIONS

CCPIT Patent and Trademark Law Office, Office Action and Search Report, Application No. 201210346475.7, Apr. 27, 2015, 15 pages.
Dieseko Group, Variable Moment Vibratory Hammers Product Range, 2023, 12 pages.
International Construction Equipment, Inc "Hydraulic Vibratory Driver/Extractors for Piling and Caisson Work," 10 pages.
International Construction Equipment, Inc "Hydraulic Vibratory Driver/Extractors for Piling and Caisson Work," Ref. No. V7-0890-51, 1974, 3 pages.
International Construction Equipment, Inc., "Diesel Pile Hammers" brochure, Ref. No. DH4-1288-5C, undated, 6 pages.
International Searching Authority, "International Search Report", Jan. 28, 2011, 11 pages.
Japan Development Consultants, Inc., "Castle Board Drain Method" Japanese language brochure, Ref. Nos. APE00857-APE00863, Aug. 1976, 6 pages.
Junttan, Hhka-Series, Hydraulic Impact Hammer, 3 pages, https://junttan.com/product/hhka-series/.
Korean document, Ref. Nos. APE00864 through APE00891, 1982-1997.
MKT Corporation, "Operating, Maintenance and Parts Manual for MS350 and MS500 Single-Acting Pile Hammers," 12 pages.
Report identifying systems for driving mandrels carrying wick drain material into the earth, Ref. Nos. APE0510-APE0536, undated, 27 pages.
Schematic drawings identified by Ref. Nos. APE01038, APE01039, and APE0339, (undated).
Shanghai Jintai SEMW, undated, 8 pages.
USPTO, "Final Office Action, U.S. Appl. No. 15/285,326,", Apr. 25, 2018, 9 pages.
USPTO, "Final Office Action, U.S. Appl. No. 15/285,326,", Aug. 14, 2017, 10 pages.
USPTO, "Final Office Action, U.S. Appl. No. 15/352,064,", Mar. 19, 2019, 15 pages.
USPTO, "Non-Final Office Action, U.S. Appl. No. 15/285,326,", Apr. 25, 2017, 10 pages.
USPTO, "Non-Final Office Action, U.S. Appl. No. 15/199,695," Sep. 19, 2018, 18 pages.
USPTO, "Non-Final Office Action, U.S. Appl. No. 15/285,326," Dec. 28, 2017, 17 pages.
USPTO, "Non-Final Office Action, U.S. Appl. No. 15/372,196," Oct. 4, 2017, 23 pages.
www.mmsonline.com/columns/micro-keying-keeps-a-better-grip.aspx, Seibert, Stan, Modern Machine Shop: "Micro-Keying Keeps a Better Grip," Aug. 1, 1992, 2 pages.

* cited by examiner

VARIABLE MOMENT VIBRATORY SYSTEMS AND METHODS

RELATED APPLICATIONS

This application claims benefit of U.S. Provisional Application Ser. No. 63/550,796 filed Feb. 7, 2024, the contents of which are incorporated herein by reference.

TECHNICAL FIELD

The present invention relates to vibratory devices for generating a vibratory force for displacing elongate members into the earth and, in particular, to vibratory systems capable of changing the vibratory force during use.

BACKGROUND

Piledriving systems and methods apply forces, typically downward, on elongate members to drive elongate members into the earth. One class of piledriving system employs vibrational driving forces created by counter-rotating eccentric weights. A class of vibrational piledrivers allows the moment of the driving force to be altered so that the magnitude of the vibratory force can be varied between a minimum (e.g., no effective driving force) and a maximum (e.g., maximum effective driving force).

The present invention relates to improved systems and methods for generating variable moment vibratory forces for driving elongate members such as construction piles into the ground.

SUMMARY

The present invention may be embodied as a coupler system for a vibratory system comprising an eccentric system comprising at least one transfer gear operatively connected to at least upper and lower eccentric members. The coupler system comprises a coupler housing defining a coupler axis, at least one drive rack supported for linear movement within the coupler housing, a coupler drive system for causing linear movement of the at least one drive rack within the coupler housing, at least one coupler gear adapted to engage the at least one transfer gear, and at least one pinion assembly operatively connected between the at least one drive rack and the at least one coupler gear. Linear movement of the at least one drive rack causes rotation of the at least one coupler gear around the coupler axis to alter an angular relationship of the upper and lower eccentric members.

The present invention may also be embodied as a coupler system for a vibratory system comprising an eccentric system comprising first and second upper transfer gears operatively connected to first and second upper eccentric members and first and second lower transfer gears operatively connected to first and second lower eccentric members, respectively. The coupler system comprises a coupler housing defining a coupler axis, first and second drive racks supported for linear movement within the coupler housing, a coupler drive system for causing linear movement of the first and second drive racks within the coupler housing, first and second coupler gears arranged to engage the second upper transfer gear and the second lower transfer gear, respectively, and first and second pinion assemblies. The first pinion assembly is operatively connected between the first drive rack and first coupler gear and the second pinion assembly is operatively connected between the second drive rack and the second coupler gear such that linear movement of the first and second drive racks causes rotation of the first and second coupler gears around the coupler axis to alter angular relationships between the first and second upper eccentric members and the first and second lower eccentric members.

The present invention may further be embodied as a vibratory system for displacing piles comprising an eccentric system, a main drive system, and a coupler system. The eccentric system comprises first and second upper transfer gears operatively connected to first and second upper eccentric members and first and second lower transfer gears operatively connected to first and second lower eccentric members, respectively. The main drive system comprises an upper main drive gear connected to the first upper transfer gear and a lower main drive gear connected to the first lower transfer gear. The coupler system comprises a coupler housing defining a coupler axis, first and second drive racks supported for linear movement within the coupler housing, a coupler drive system for causing linear movement of the first and second drive racks within the coupler housing, first and second coupler gears arranged to engage the second upper transfer gear and the second lower transfer gear, respectively, and first and second pinion assemblies. The first pinion assembly is operatively connected between the first drive rack and first coupler gear and the second pinion assembly is operatively connected between the second drive rack and the second coupler gear such that linear movement of the first and second drive racks causes rotation of the first and second coupler gears around the coupler axis. The first and second coupler gears are operatively connected to the second upper transfer gear and the second lower transfer gear, respectively, such that rotation of the first and second coupler gears around the coupler axis alters angular relationships between the first and second upper eccentric members and the first and second lower eccentric members.

The present invention may be embodied as a method of altering an angular relationship between at least upper and lower eccentric members of an eccentric system of a vibratory system, where the eccentric system comprises at least one transfer gear operatively connected to the at least upper and lower eccentric members, the method comprising the following steps. A coupler housing defining a coupler axis is provided. At least one drive rack is supported for linear movement within the coupler housing. A coupler drive system is arranged to cause linear movement of the at least one drive rack within the coupler housing. The at least one coupler gear is supported to engage the at least one transfer gear. The at least one pinion assembly is operatively connected to the at least one drive rack and the at least one coupler gear. The coupler drive system is operated such that linear movement of the at least one drive rack causes rotation of the at least one coupler gear around the coupler axis to alter the angular relationship between the upper and lower eccentric members.

DETAILED DESCRIPTION

Figure 1:
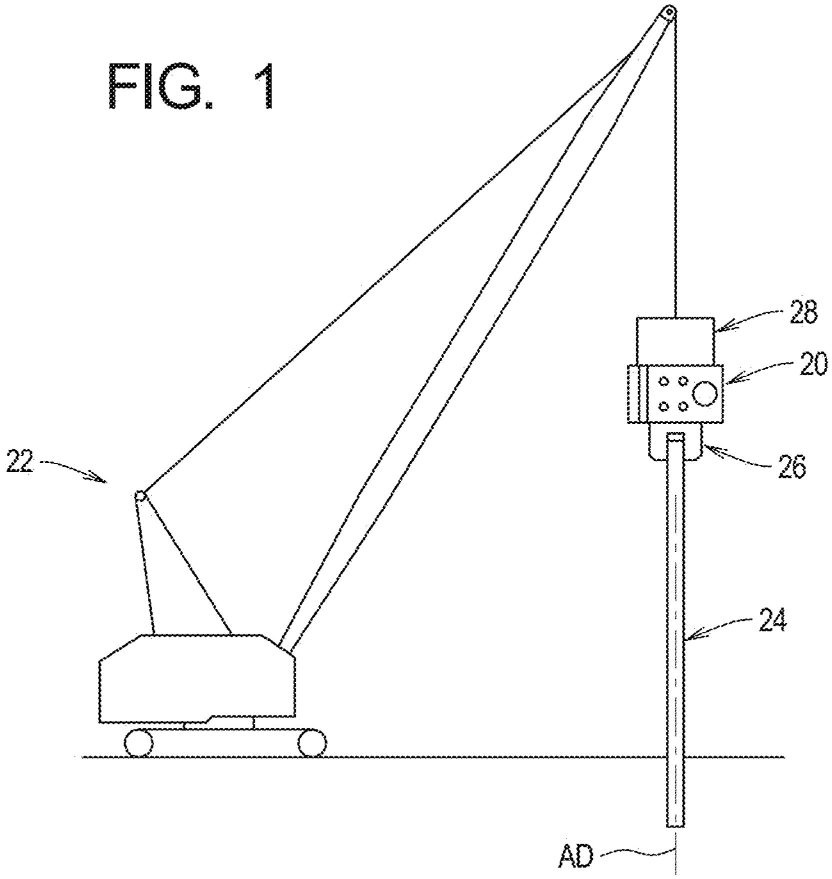
FIG. 1 is a highly schematic side elevation view of an example environment in which a first example vibratory system of the present invention may be used

Referring initially to FIG. 1 of the drawing, depicted at 20 therein is a first example vibratory system constructed in accordance with, and embodying, the principles of the present invention. FIG. 1 illustrates that the first example vibratory system 20 may be supported with a support system 22 and secured to an elongate member 24 using a clamp system 26. FIG. 1 further illustrates a suppressor system 28 connected between the first example vibratory system 20 and the example support system 22.

The support system 22, elongate member 24, clamp system 26, and suppressor system 28 are or may be conventional and do not form a part of the first example vibratory system 20. The support system 22, elongate member 24, clamp system 26, and suppressor system 28 will thus be described herein only to that extent helpful to a complete understanding of the present invention. Further, the example support system 22, elongate member 24, clamp system 26, and suppressor system 28 are illustrated as examples only and other support systems, elongate members, clamp systems, and suppressor systems may be used with the first example vibratory system 20.

Figure 2:
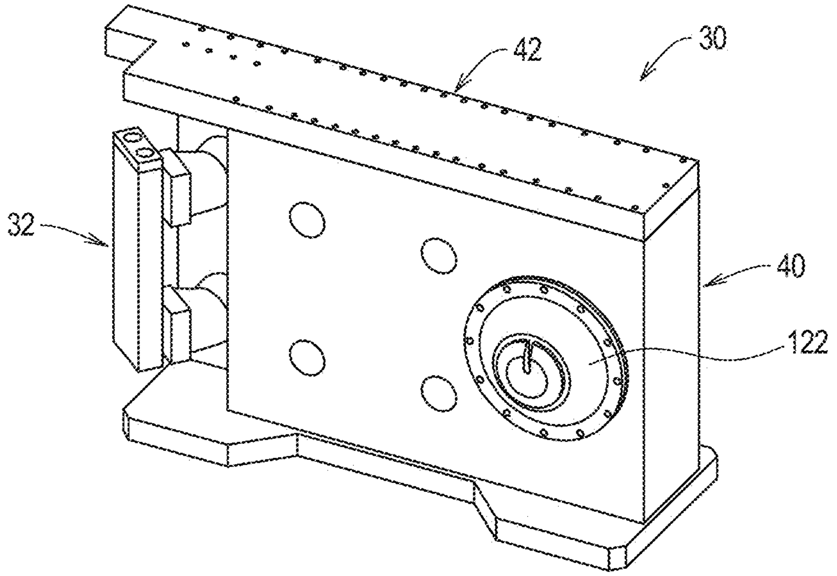
FIG. 2 is a perspective view of the first example vibratory system of the present invention.
Figure 3:
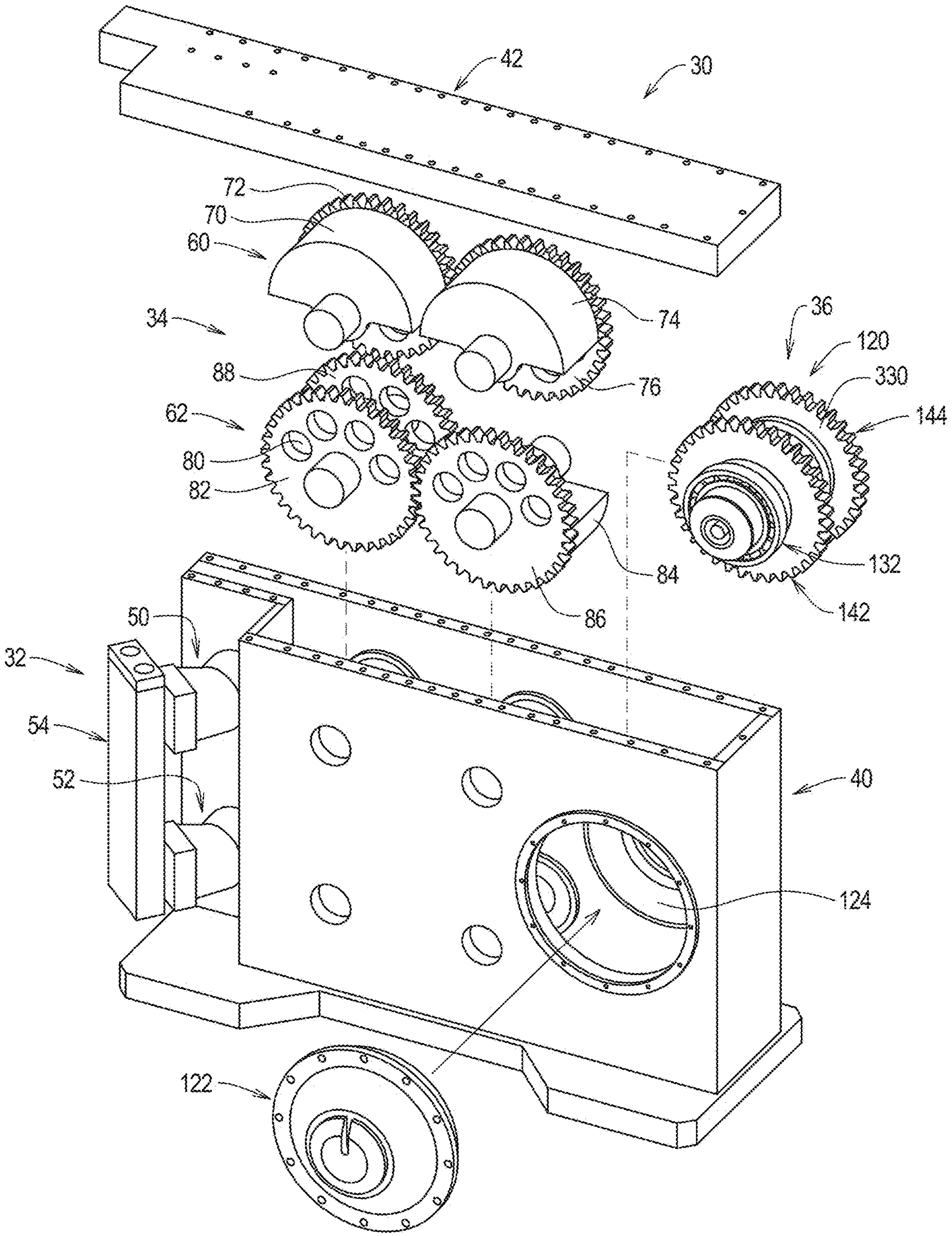
FIG. 3 is an exploded perspective view of the first example vibratory system.

FIGS. 2 and 3 of the drawing illustrate that the first example vibratory system 20 comprises a main housing assembly 30, a main drive system 32, an eccentric system 34, and a coupler system 36. The main housing assembly 30 supports the main drive system 32, the eccentric system 34, and the coupler system 36. The main drive system 32 causes rotation of the eccentric system 34 to generate, under certain conditions, a vibratory force along a drive axis AD (FIG. 1). The example coupler system 36 is operatively connected to the eccentric system 34 such that a relative angular configuration of the eccentric system 34 can be varied to vary the vibratory force generated by rotation of the eccentric system 34 as will be described in further detail below.

Figure 4:
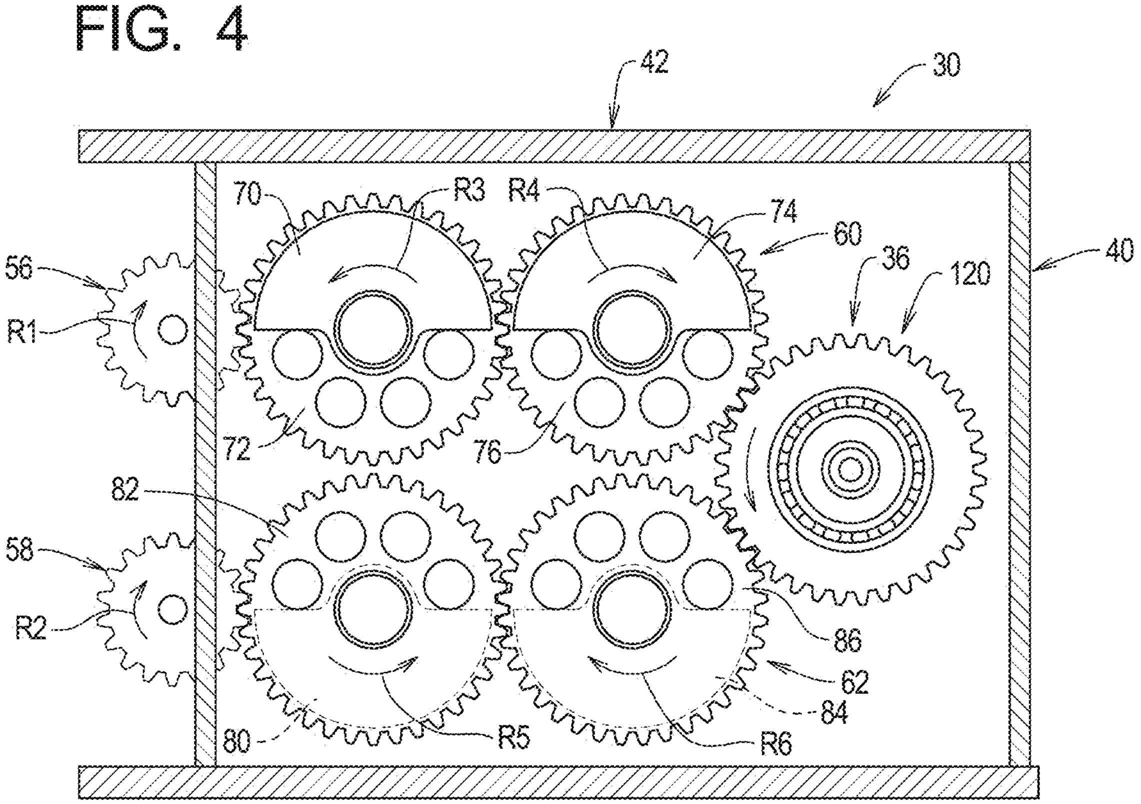
FIG. 4 is a side elevation section view illustrating the first example vibratory system in a fully out-of-phase configuration.
Figure 5:
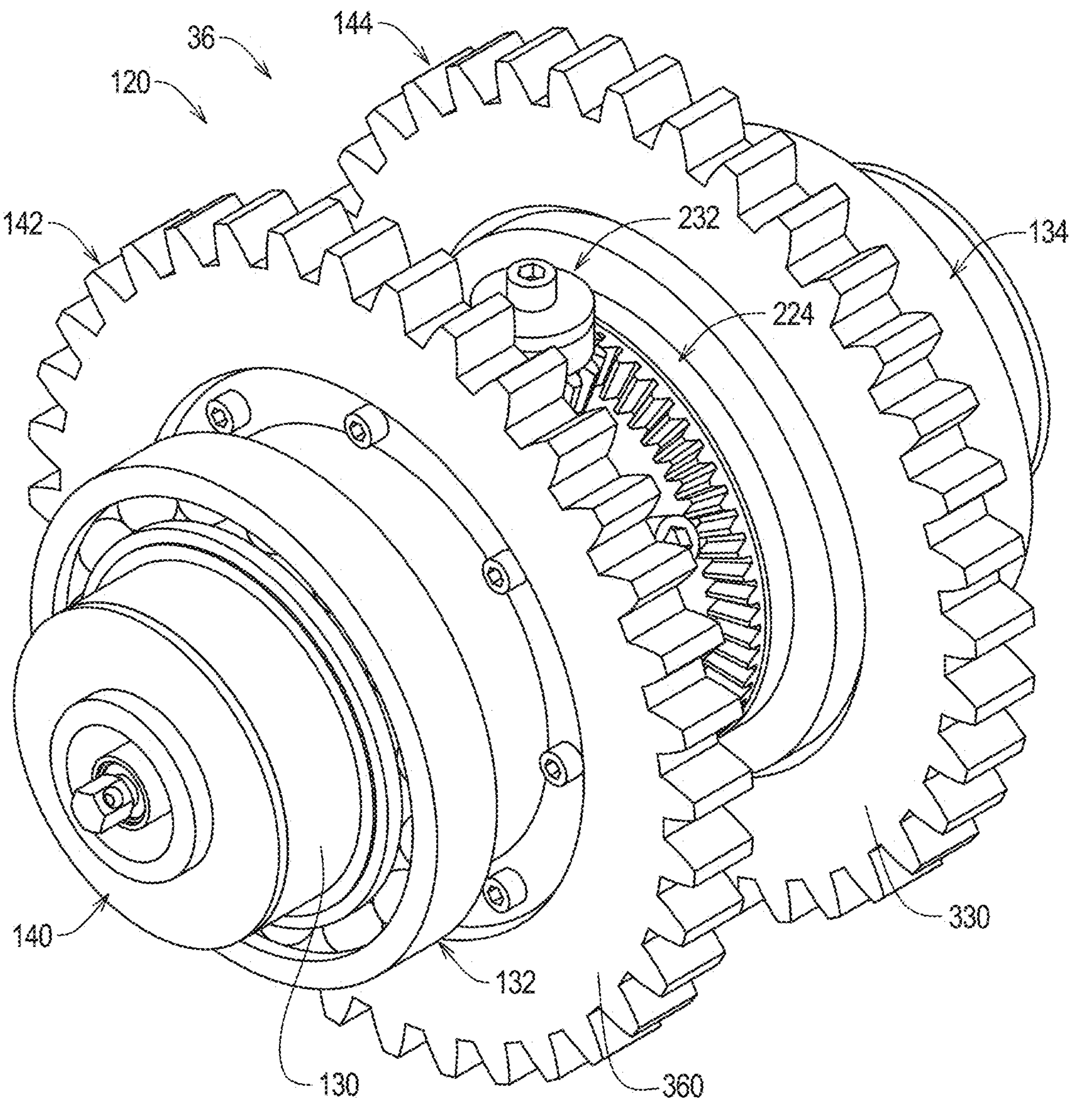
FIG. 5 is a perspective view of a first example coupler system of the first example vibratory device.
Figure 6:
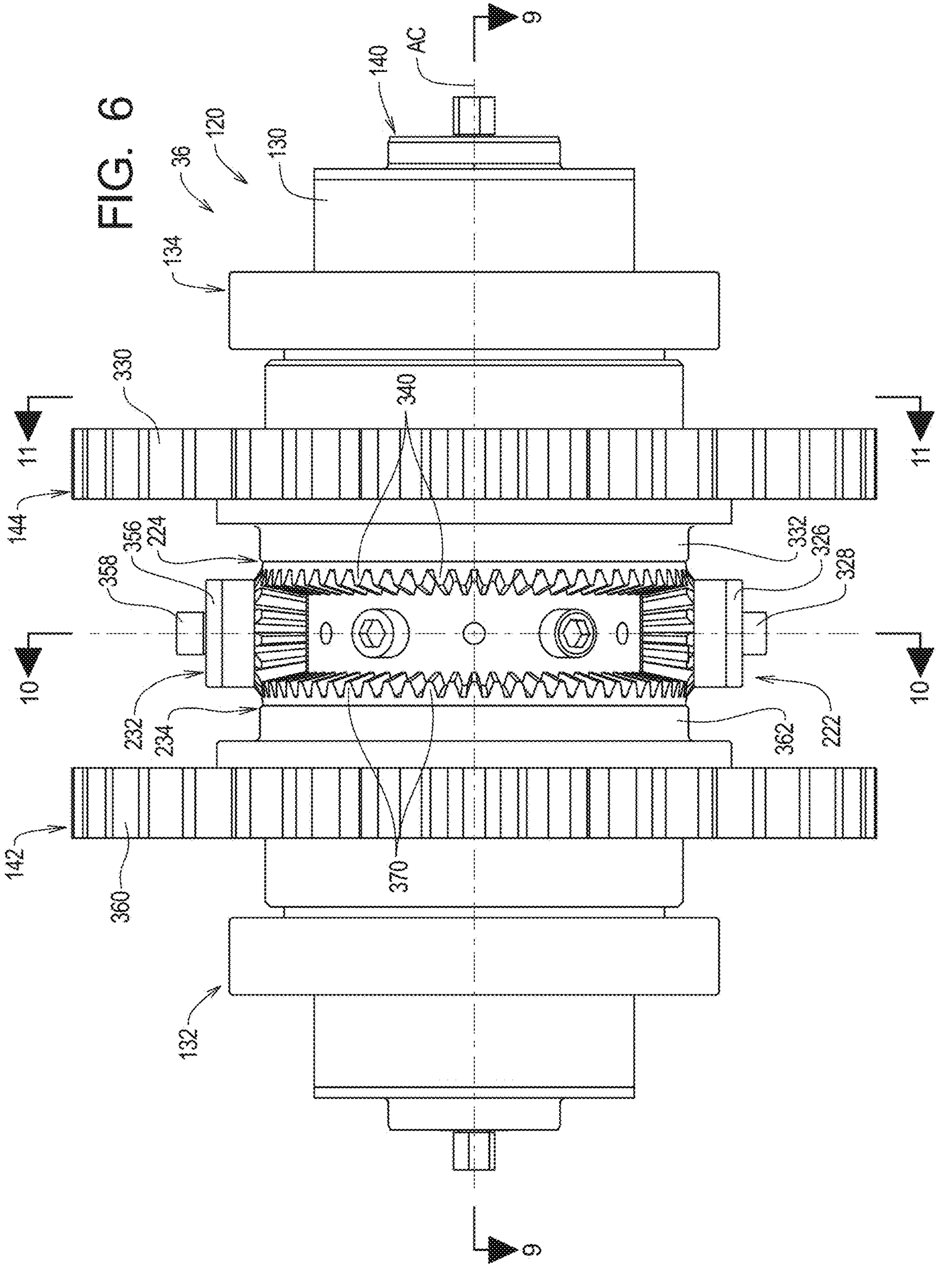
FIG. 6 is a side elevation view of the first example coupler system.
Figure 7:
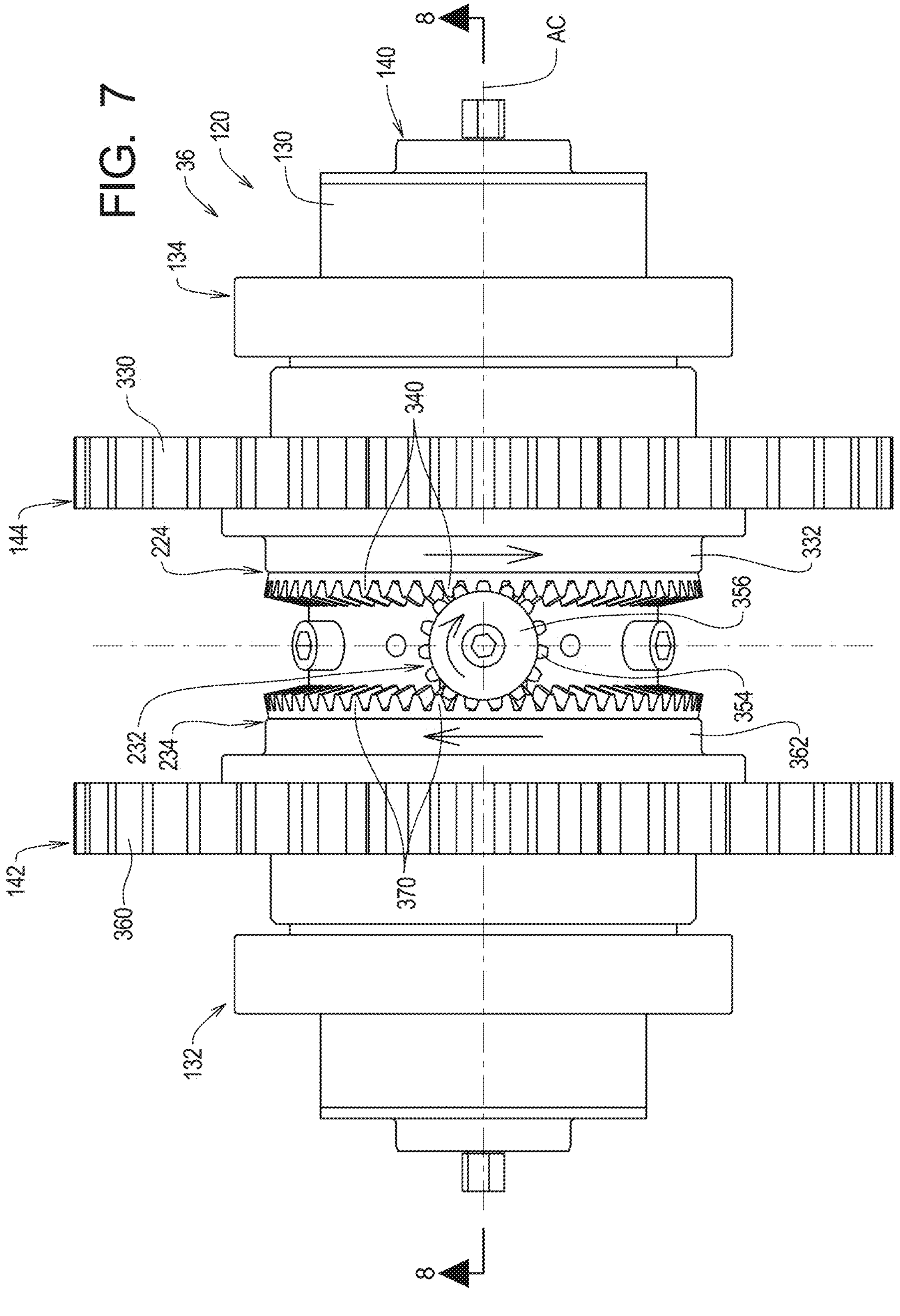
FIG. 7 is a top elevation view of the first example coupler system.
Figure 8:
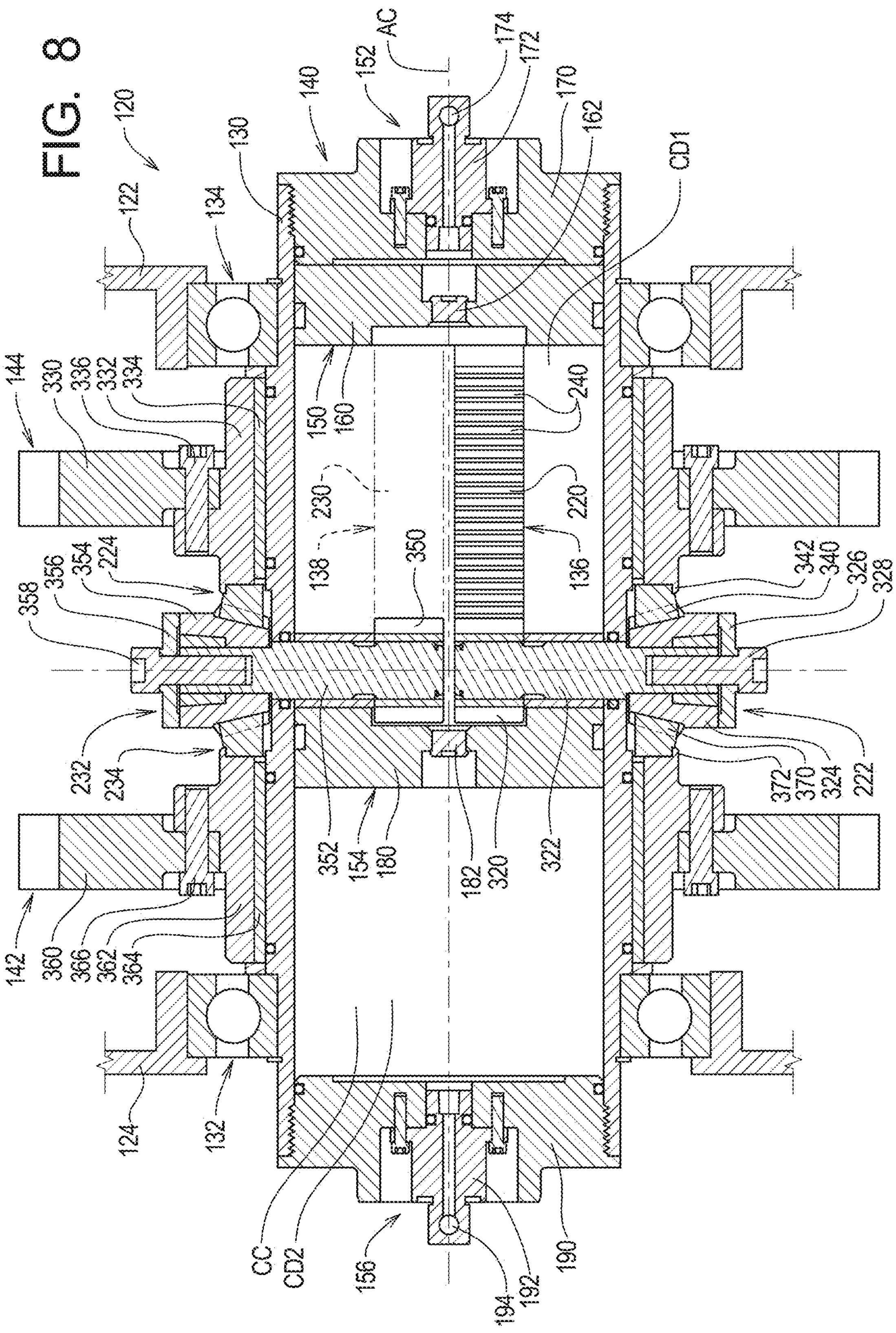
FIG. 8 is a section view taken along lines 8-8 in FIG. 7.
Figure 9:
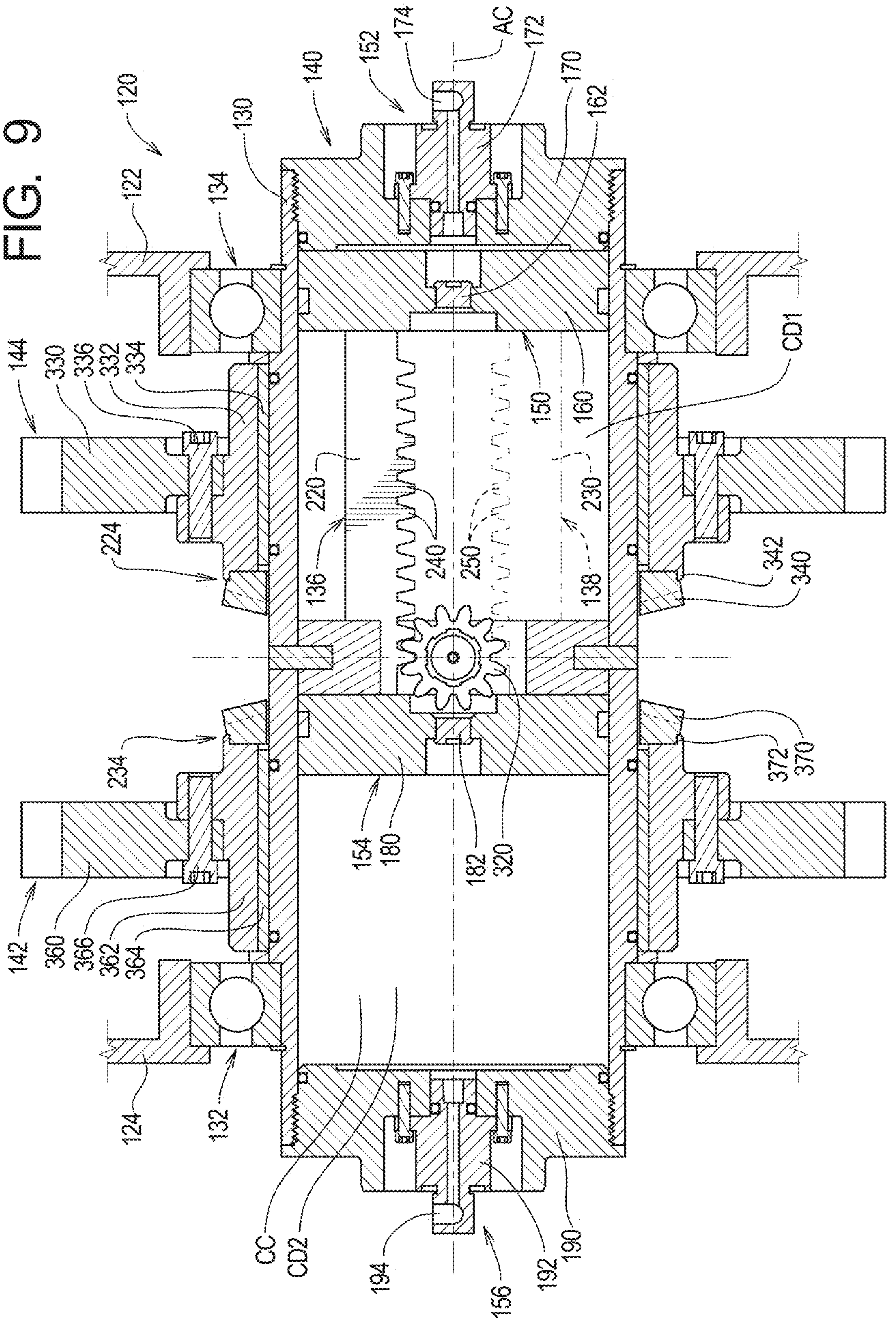
FIG. 9 is a section view taken along lines 9-9 in FIG. 6 illustrating a configuration of the first example coupler system when the first example variable moment system is in a fully out-of-phase configuration.
Figure 10:
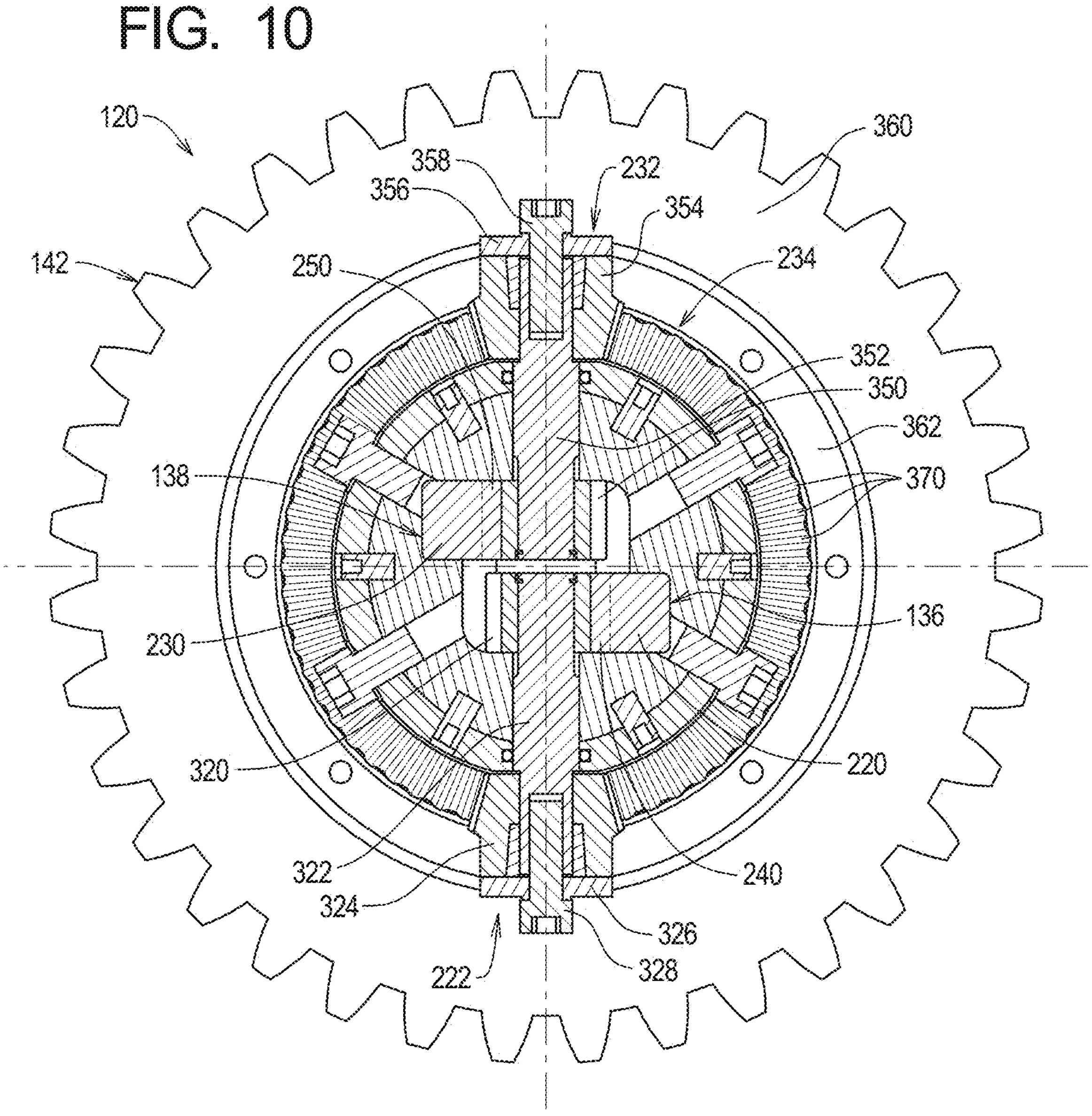
FIG. 10 is a section view taken along lines 10-10 in FIG. 6.
Figure 11:
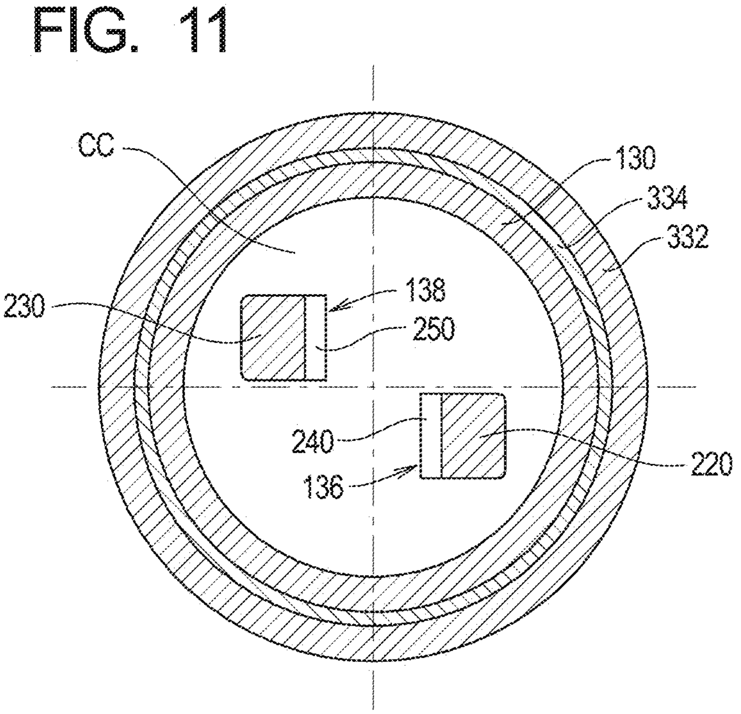
FIG. 11 is a section view taken along lines 11-11 in FIG. 6.

The example main housing assembly 30 is configured to support the main drive system 32, the eccentric system 34, and coupler system 36 in the in a predetermined relationship with each other as shown, for example, in FIG. 4. The example main housing assembly 30 is further configured to be supported by the support system 22, directly and/or through the optional suppressor system 28, and to transfer vibratory forces to the elongate member 24 as generally depicted in FIG. 1. FIGS. 3 and 4 illustrate that the example main housing assembly 30 comprises a housing structure 40 and a housing cover 42. The exact parameters of the main housing assembly 30 are not critical so long as the function of the main housing assembly 30 as described herein is achieved. FIG. 3 further illustrates first and second main drive assemblies 50 and 52 and a drive block 54. Hydraulic fluid introduced into the drive block 54 causes the first and second main drive assemblies 50 and 52 to rotate an upper main drive gear 56 and a lower main drive gear 58, respectively, as shown in FIG. 4, as will be described in further detail below.

Turning now to FIGS. 3 and 4 of the drawing, the basic operation of example eccentric system 34 of the first example vibratory system 20 will now be described. In FIG. 4, angular orientations of the first and second upper eccentric members 70 and 74 and of the first and second lower eccentric members 80 and 84 are the same. The configuration depicted in FIG. 4 will be referred to as the fully in-phase configuration.

More specifically, in the state depicted in FIG. 4 all of the first and second upper eccentric members 70 and 74 and the first and second lower eccentric members 80 and 84 are in a fully downward position relative to true vertical. As further shown in FIG. 4, the upper main drive gear 56 directly engages the first upper transfer gear 72, while the lower main drive gear 58 engages the lower secondary drive gear 88 (FIG. 3) which is rigidly mounted on the same shaft as the first lower transfer gear 82. The example eccentric member 80 and gear 82 are bolted together or otherwise integrally formed or connected to form one assembly, and the eccentric member 84 and a second lower transfer gear 86 are bolted together or otherwise integrally formed or connected to form are another assembly. The eccentric member 80 and gear 82 thus rotate together about a first shaft, and the eccentric member 84 and gear 86 thus rotate together about a second shaft.

As shown in FIG. 4, rotation of the first and second main drive gears 56 and 58 in directions as shown by arrows R1 and R2 causes rotation of the eccentric member 70, eccentric member 74, eccentric member 80/88, and eccentric member 84 in the directions shown by R3, R4, R4, and R6, respectively. Rotation of the eccentrics 70, 74, 80/88, and 84, when starting in the relative angular positions shown in FIG. 4 in the directions shown by arrows R3, R4, R5, and R6 results in the cancellation of lateral forces generated by the eccentrics 70 and 74 and 80/88, and 84 and summation of the vertical forces generated by the eccentrics 70, 74, 80/88, and 84. The example eccentric system 34 in this configuration thus generates only vertical vibratory forces that may be transmitted to the elongate member 24.

With the foregoing basic understanding of the operation of the example eccentric system 34 in mind, the construction and operation of the example coupler system 36 and the interaction of the example coupler system 36 with the example eccentric system 34 will now be described in detail.

FIG. 3 illustrates that the example coupler system 36 comprises a coupler assembly 120 and first and second coupler caps 122 and 124. FIGS. 5-11 illustrate that the example coupler assembly 120 comprises a coupler housing 130, first and second bearing assemblies 132 and 134, first and second rack guide assemblies 136 and 138, a coupler drive system 140, and first and second coupler gear assemblies 142 and 144.

The exact construction of the example coupler housing 130 is not critical so long as the coupler housing 130 is capable of supporting the first and second bearing assemblies 132 and 134, first and second rack guide assemblies 136 and 138, a coupler drive system 140, and first and second coupler gear assemblies 142 and 144 as will be described in detail below. The example coupler housing 130 is a generally cylindrical rigid body defining a coupler axis AC and further defines an inner surface for supporting the first and second rack guide assemblies 136 and 138, open ends and side openings for supporting the coupler drive system 140, and an outer surface for supporting the first and second coupler gear assemblies 142 and 144.

The example coupler drive system 140 comprises a first drive piston assembly 150, a first drive port assembly 152, a second drive piston assembly 152, and a second drive port assembly 156. The first drive piston assembly 150 comprises a first piston member 160 and a piston plug 162. The example first drive port assembly 152 comprises a first drive port plate 170 and a first drive port member 172. The first drive port assembly 152 defines a first drive port 174. The second drive piston assembly 152 comprises a second piston member 180 and a piston plug 182. The example second drive port assembly 152 comprises a second drive port plate 190 and a second drive port member 192. The second drive port assembly 152 defines a second drive port 194.

The example piston members 160 and 180 are arranged within the coupler housing 130, and the drive port plates 170 and 190 are secured to ends of the coupler housing 130. The drive port members 172 and 192 are secured to the drive plates 170 and 190 such that the first drive port 174 is in fluid communication with a first drive chamber CD1 formed at a first end of the coupler housing 130 and such that the second drive port 194 is in fluid communication with a second drive chamber CD2 formed at a second end of the coupler housing 130. Introduction of drive fluid into the drive chambers displaces the piston members 160 and 180 along the coupler axis AC.

The example coupler drive system 140 further comprises a first drive rack 220, a first coupler pinion assembly 222, a first coupler gear assembly 224, a second drive rack 230, a second coupler pinion assembly 232, and a second coupler gear assembly 234. The first drive rack 220 defines first drive rack teeth 240, and the second drive rack 230 defines second drive rack teeth 250. The example drive rack teeth 240 and 250 are straight, parallel projections that extend from the drive racks 220 and 230, respectively.

The example first coupler pinion assembly 222 comprises a first inner pinion 320, a pinion shaft 322, a first outer pinion 324, a first pinion cap 326, and a first pinion bolt 328. The example first coupler gear assembly 224 comprises a first coupler gear 330, a first coupler gear support member 332, a first coupler gear bearing sleeve 334, and a first coupler gear bolt 336. The example first coupler gear 330 defines first coupler gear teeth 340, and the example first coupler gear support 332 defines first coupler gear support teeth 342.

The example second coupler pinion assembly 232 comprises a second inner pinion 350, a pinion shaft 352, a second outer pinion 354, a second pinion cap 356, and a second pinion bolt 358. The example second coupler gear assembly 234 comprises a second coupler gear 360, a second coupler gear support member 364, a second coupler gear bearing sleeve 364, and a second coupler gear bolt 366. The example second coupler gear 350 defines second coupler gear teeth 370, and the example second coupler gear support 352 defines second coupler gear support teeth 372.

The inner pinions 320 and 350 define inner pinion teeth configured to engage the drive rack teeth 240 and 250, respectively, to convert linear movement of the drive racks 220 and 230 into rotational movement of the pinion shafts 322 and 252 about longitudinal axes of these shafts 322 and 352. In turn, the outer pinions 324 and 354 define outer pinion teeth configured to engage the coupler gear support teeth 342 and 372, respectively, such that axial rotation of the pinion shafts 322 and 352 causes rotation of the coupler gear supports 332 and 362 about coupler gear support axes radially extending from the coupler axis AC. Further, rotation of the coupler gear supports 332 and 362 about the coupler gear support axes causes rotation of the coupler gears 330 and 360 about the coupler axis AC.

Figure 12A:
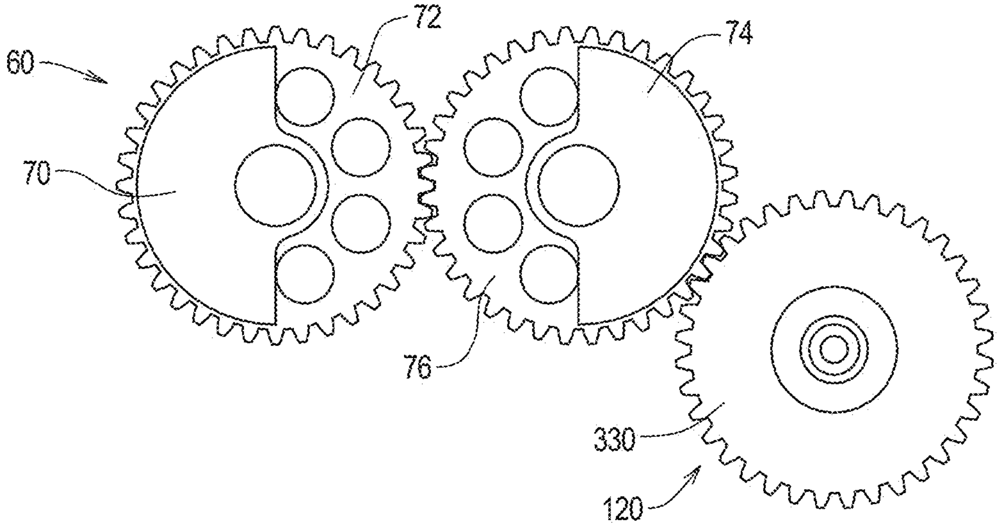
FIGS. 12A and 12B are somewhat schematic side elevation views illustrating relationships among eccentric assemblies when the first example vibratory system is in the fully out-of-phase configuration.
Figure 12B:
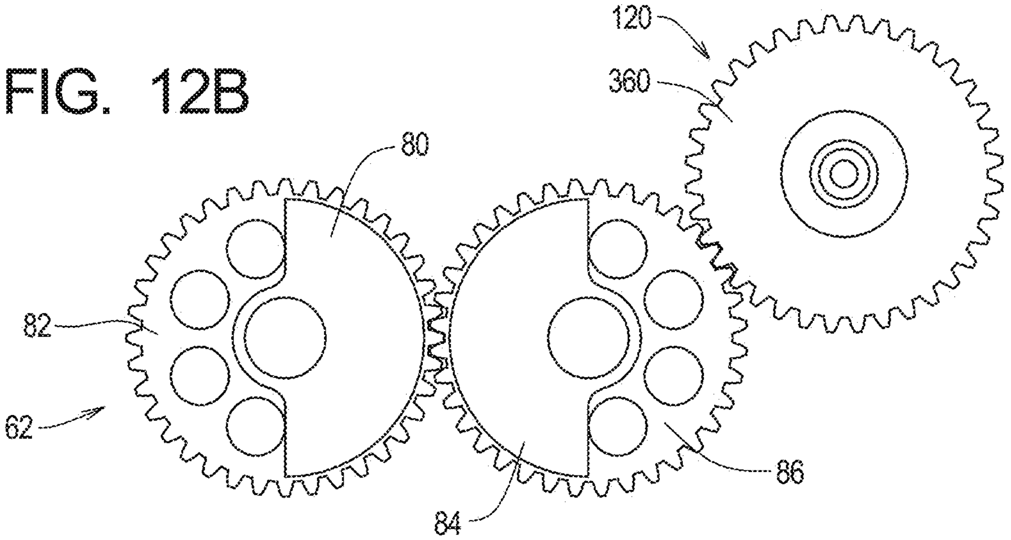
Figure 14A:
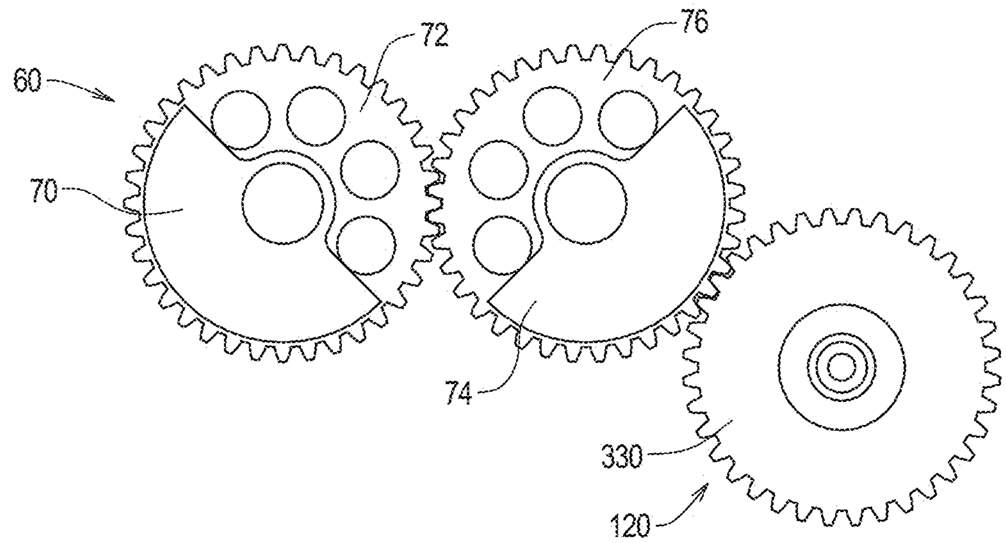
FIGS. 14A and 14B are somewhat schematic side elevation views illustrating relationships among eccentric assemblies when the first example vibratory system is in the partly out-of-phase configuration.
Figure 14B:
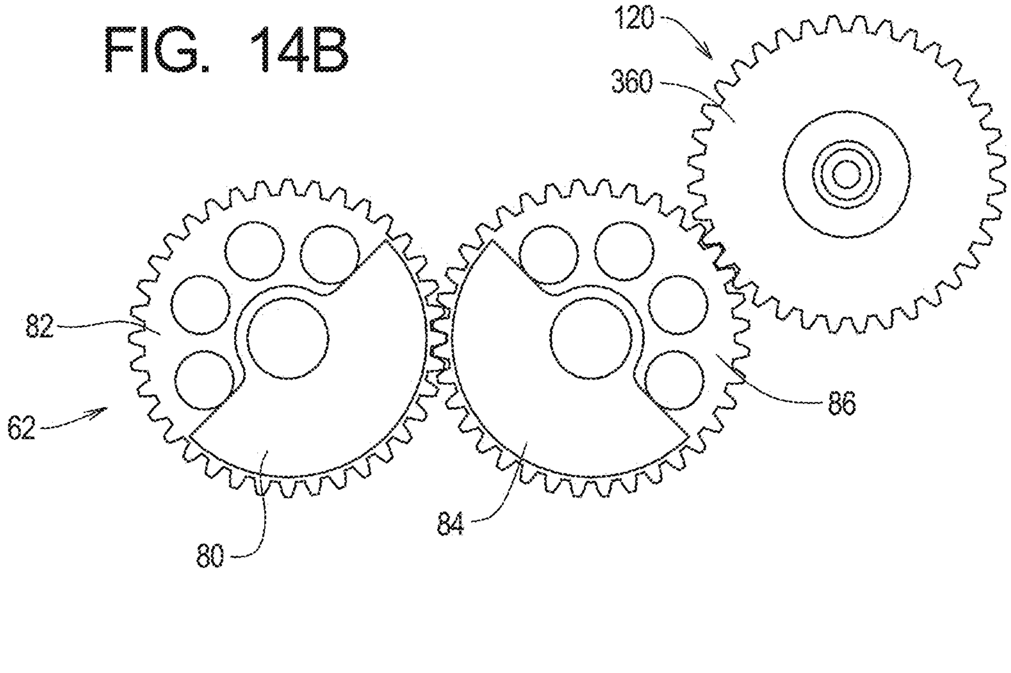
Figure 16A:
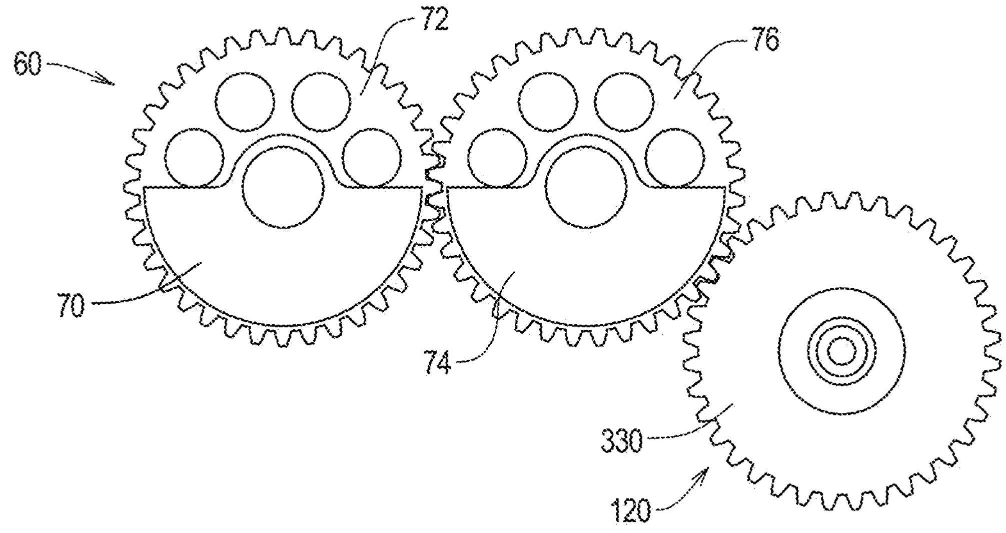
FIGS. 16A and 16B are somewhat schematic side elevation views illustrating relationships among eccentric assemblies when the first example vibratory system is in the in-phase configuration.
Figure 16B:
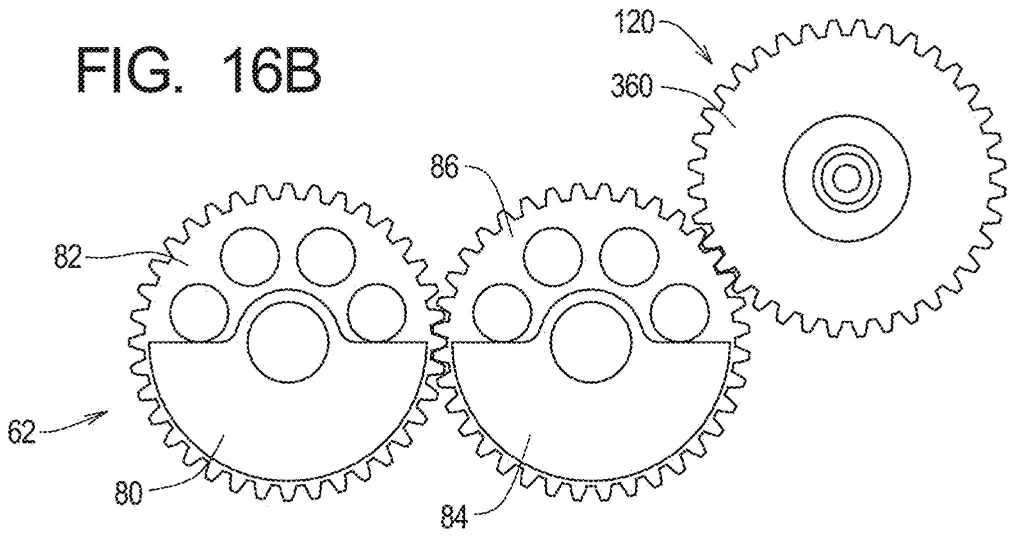

In general, the example coupler system 36 engages the example eccentric system 34 to allow relative angular relationships among the first and second upper eccentric members 70 and 74 and the first and second lower eccentric members 80/88 and 84 to be altered to vary the amount of vibratory force generated by the first example vibratory system 20 along the drive axis AD. When the eccentrics are in the configuration as depicted in FIGS. 4, 12A, and 12B, the first example vibratory system 20 generates minimum vibratory force (0% vibratory force) along the drive axis AD. When the eccentrics are in the configuration depicted in FIGS. 16A and 16B, the eccentrics 70, 74, 80/88, and 84 are rotated such that the first example vibratory system 20 generates maximum vibratory force (100% vibratory force) along the drive axis AD. And when, as depicted for example in FIGS. 14A and 14B, the eccentrics are between fully out-of-phase configuration as depicted in FIGS. 4, 12A, and 12B and the in-phase configuration depicted in FIGS. 16A and 16B, the first example vibratory system 20 generates an intermediate vibratory force along the drive axis AD. The vibratory force generated by the first example vibratory system 20 may thus be altered such that the magnitude of the vibratory at any given point in time can be varied along a continuum between minimum (0% vibratory force) and maximum (100% vibratory force) as required by the conditions in which the first example vibratory system 20 is being used.

More specifically, the coupler assembly 120 is supported such that, as perhaps best shown in FIGS. 4, 12A, 12B, 14A, 14B, 16A, and 16B, the first coupler gear 330 engages the second upper transfer gear 76 and the second coupler gear 360 engages the second lower transfer gear 86. Further, operation of the coupler drive system 140 alters angular positions of the first and second coupler gears 330 and 360 relative to the coupler axis AC. The relative angular positions of the eccentric members 70, 74, 80/88, and 84 are determined by angular positions of the first and second coupler gears 330 and 360 relative to each other about the coupler axis AC. And with the first coupler gear 330 in engagement with the second upper transfer gear 76 of the upper eccentric assembly 60 and the second coupler gear 360 in engagement with the second lower transfer gear 86 of the lower eccentric assembly operation of the first and second main drive assemblies 50 and 52 causes the entire coupler assembly 120 to be rotated about the coupler axis AC.

Accordingly, operation of the coupler drive system 140 to alter relative angular positions of the first and second coupler gears 330 and 360 alters, through the first and second coupler gears 330 and 360 and the transfer gears 76 and 86, the relative angular positions of eccentric members 70, 74, 80/88, and 84 during operation of the example eccentric system 34. Operation of the example coupler drive system 140 is thus capable of altering the vibratory force generated by the example eccentric system 34 and thus the first example vibratory system 20 during operation of the first example vibratory system 20.

Turning now to FIGS. 5-11, the construction and operation of the example coupler assembly 20 will be described in further detail. The example first and second coupler caps 122 and 124 are threaded onto opposite ends of the coupler housing 130 to define a coupler chamber CC. The first and second drive port plates 170 and 190 are rigidly supported by the first and second coupler caps 122 and 124. The first and second drive racks 220 and 230 are supported by the first and second rack guide assemblies 136 and 138 within the coupler chamber CC for linear movement in directions offset from but parallel to the coupler axis AC. With the drive racks 220 and 230 so supported, the sets of first drive rack teeth 240 and second drive rack teeth 250 are substantially parallel to each other (FIGS. 8 and 9), are symmetrically spaced from each other relative to the coupler axis AC, and face opposite directions (FIG. 9) with respect to a plane extending through the coupler axis AC and evenly spaced from the drive racks 220 and 230.

The first and second piston drive piston assemblies 150 and 154 are supported within the coupler chamber CC to define the first and second drive chambers CD1 and CD2, for linear movement along the coupler axis AC, and to act on the first and second drive racks 220 and 230. Operation of the piston drive assemblies 150 and 154 thus causes movement of the first and second drive racks between a first end position (FIGS. 8 and 9), through a continuum of intermediate positions (one example shown in FIG. 13), and a second end position (FIG. 15).

FIGS. 5-10, 13, and 15 further illustrate that the first and second pinion assemblies 222 and 232 are supported by the coupler housing 130 such that the first inner pinion 320 engages the first drive rack 220, the second inner pinion 350 engages the second drive rack 230, the first outer pinion 324 engages the first coupler gear support 332, and the second outer pinion 354 engages the second coupler gear support 362. The first coupler gear support 332 supports the first coupler gear 330 such that revolution of the first coupler gear support 332 about the coupler axis AC causes rotation of the first coupler gear 330 about the coupler axis AC. Further, the second coupler gear support 362 supports the second coupler gear 360 such that revolution of the second coupler gear support 362 about the coupler axis AC causes rotation of the second coupler gear 360 about the coupler axis AC in a direction opposite that of the first coupler gear 330. Accordingly, linear movement of the drive racks 220 and 230 acts on the first and second coupler gear assemblies 224 and 234 through the first and second pinion assemblies 222 and 232 to rotate the first and second coupler gears 330 and 360 in opposite directions about the coupler axis AC as depicted in arrows in FIG. 7.

Figure 13:
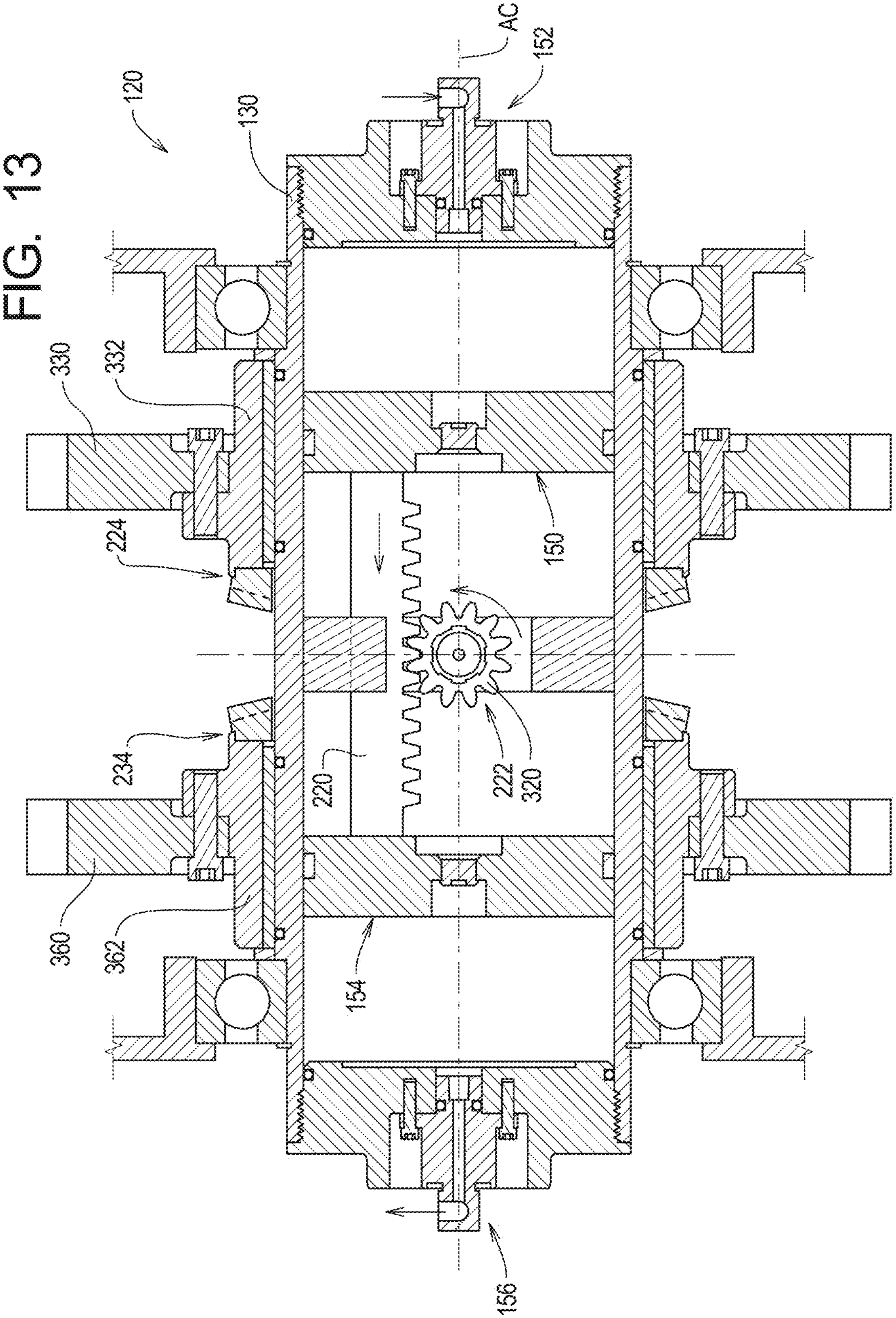
FIG. 13 is a section view similar to FIG. 9 but illustrating a configuration of the first example coupler system when the first example variable moment system is in a partly out-of-phase configuration.
Figure 15:
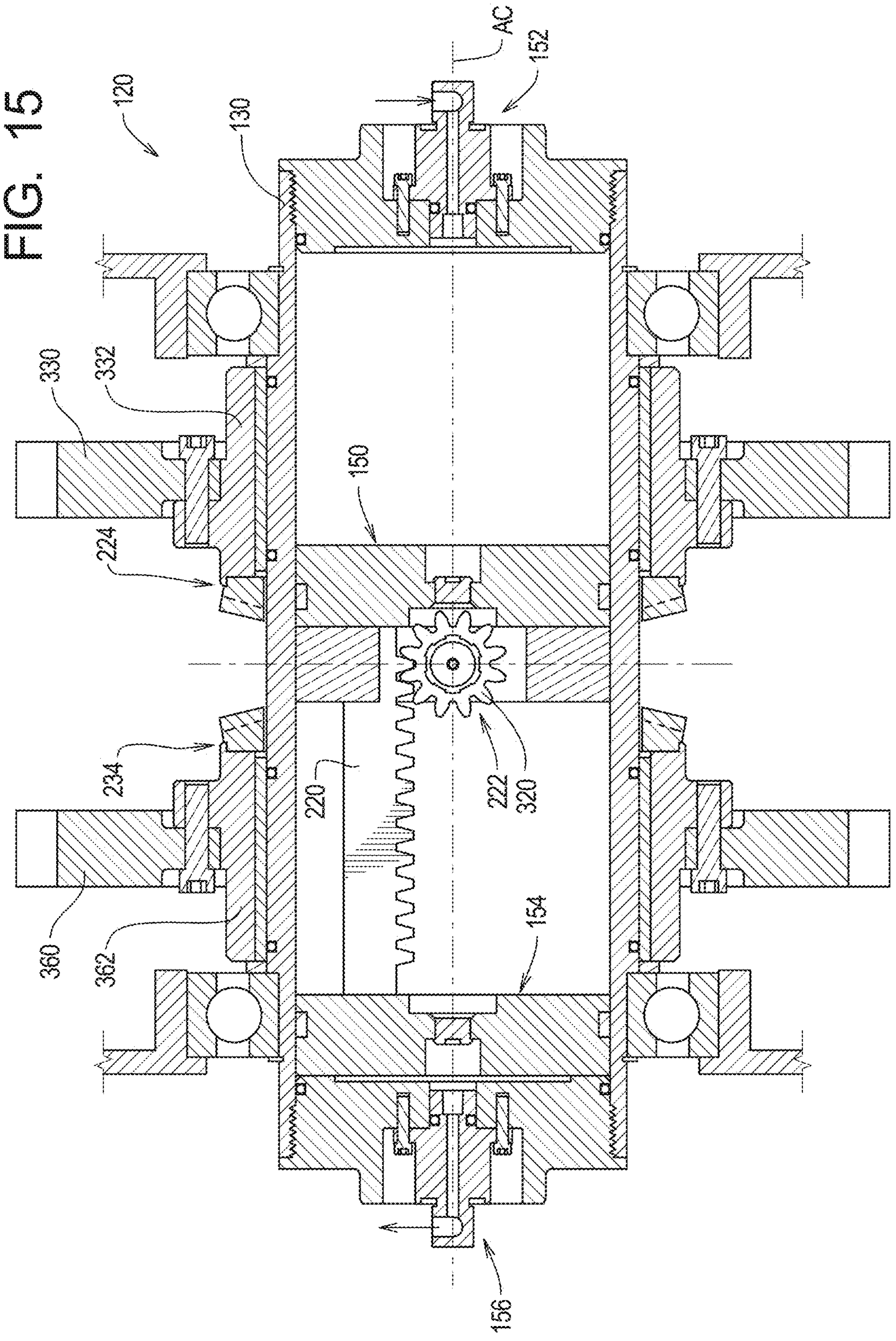
FIG. 15 is a section view similar to FIGS. 9 and 13 but illustrates a configuration of the first example coupler system when the first example variable moment system is in the in-phase configuration.

To displace the first and second drive racks 220 and 230 from the first end position (FIGS. 8 and 9) to the second end position (FIG. 15), fluid is introduced into the first drive chamber CD1 through the first drive port assembly 152 and allowed to flow out of the second drive chamber CD2 through the second drive port assembly 156 as shown by arrows in FIGS. 13 and 15. To displace the first and second drive racks 220 and 230 from the second end position (FIG. 15) back to the first end position (FIGS. 8 and 9), fluid is introduced into the second drive chamber CD2 through the second drive port assembly 156 and allowed to flow out of the second drive chamber CD2 through the first drive port assembly 152.

The structure of the components of the example coupler assembly 120 is substantially symmetrical about the coupler axis AC to increase stability of the coupler system 36 as the coupler assembly 120 is caused to rotate about the coupler axis AC by rotation of the transfer gears 72, 76, 82, and 86. Further, any movement within the example coupler assembly 120, such as linear movement of the drive racks 220 and 230, axial rotation of the pinion assemblies 222, axial rotation of the coupler supports 332 and 362, and rotation of the coupler of the coupler gears 330 and 360 about the coupler axis AC, does not substantially affect the center of gravity of the coupler assembly 120 with respect to rotation of the coupler assembly 120 about the coupler axis AC.

The use of drive racks 220 and 230 having straight, parallel drive rack teeth 240 and 250 simplifies construction of the components of the example coupler system 360. The hydraulic system (not shown) used to introduce fluid into the drive ports 174 and 194 is or may be conventional and allows the operator or a control system (not shown) to adjust the magnitude of the vibratory force generated by the example vibratory system 20 as necessary for a particular set of use conditions.

What is claimed is:

1. A coupler system for a vibratory system comprising an eccentric system comprising at least one transfer gear operatively connected to at least upper and lower eccentric members, the coupler system comprising:

a coupler housing defining a coupler axis;

at least one drive rack supported for linear movement within the coupler housing;

a coupler drive system for causing linear movement of the at least one drive rack within the coupler housing;

at least one coupler gear adapted to engage the at least one transfer gear; and at least one pinion assembly operatively connected between the at least one drive rack and the at least one coupler gear such that linear movement of the at least one drive rack causes rotation of the at least one coupler gear around the coupler axis to alter an angular relationship of the upper and lower eccentric members.

2. A coupler system as recited in claim 1, in which the vibratory system comprises a housing structure, where the coupler system further comprises at least one bearing assembly arranged to support the coupler housing for rotation relative to the housing structure.

3. A coupler system as recited in claim 1, in which the vibratory system comprises a housing structure, where the coupler system further comprises first and second bearing assemblies arranged to support the coupler housing for rotation relative to the housing structure.

4. A coupler system as recited in claim 1, where the coupler drive system comprises at least one drive piston supported relative to the coupler housing to define at least one drive chamber such that introduction of fluid into the at least one drive chamber displaces the at least one drive rack.

5. A coupler system for a vibratory system comprising an eccentric system comprising first and second upper transfer gears operatively connected to first and second upper eccentric members and first and second lower transfer gears operatively connected to first and second lower eccentric members, respectively, the coupler system comprising:

a coupler housing defining a coupler axis;

first and second drive racks supported for linear movement within the coupler housing;

a coupler drive system for causing linear movement of the first and second drive racks within the coupler housing;

first and second coupler gears arranged to engage the second upper transfer gear and the second lower transfer gear, respectively; and first and second pinion assemblies, where the first pinion assembly is operatively connected between the first drive rack and first coupler gear and the second pinion assembly is operatively connected between the second drive rack and the second coupler gear such that linear movement of the first and second drive racks causes rotation of the first and second coupler gears around the coupler axis to alter angular relationships between the first and second upper eccentric members and the first and second lower eccentric members.

6. A coupler system as recited in claim 5, in which the vibratory system comprises a housing structure, where the coupler system further comprises at least one bearing assembly arranged to support the coupler housing for rotation relative to the housing structure.

7. A coupler system as recited in claim 5, in which the vibratory system comprises a housing structure, where the coupler system further comprises first and second bearing assemblies arranged to support the coupler housing for rotation relative to the housing structure.

8. A coupler system as recited in claim 5, where the coupler drive system comprises first and second drive pistons supported relative to the coupler housing to define first and second drive chambers such that introduction of fluid into at least one of the first and second drive chambers displaces at least one of the first and second drive racks.

9. A vibratory system as recited in claim 5, in which the vibratory system further comprises a housing structure, where the coupler system further comprises at least one bearing assembly arranged to support the coupler housing for rotation relative to the housing structure.

10. A vibratory system as recited in claim 5, in which the vibratory system further comprises a housing structure, where the coupler system further comprises first and second bearing assemblies arranged to support the coupler housing for rotation relative to the housing structure.

11. A vibratory system as recited in claim 5, where the coupler drive system comprises first and second drive pistons supported relative to the coupler housing to define first and second drive chambers such that introduction of fluid into at least one of the first and second drive chambers displaces at least one of the first and second drive racks.

12. A vibratory system for displacing piles comprising:

an eccentric system comprising first and second upper transfer gears operatively connected to first and second upper eccentric members, and first and second lower transfer gears operatively connected to first and second lower eccentric members, respectively;

a main drive system comprising an upper main drive gear connected to the first upper transfer gear, and a lower main drive gear connected to the first lower transfer gear;

a coupler system comprising a coupler housing defining a coupler axis;

first and second drive racks supported for linear movement within the coupler housing;

a coupler drive system for causing linear movement of the first and second drive racks within the coupler housing;

first and second coupler gears arranged to engage the second upper transfer gear and the second lower transfer gear, respectively; and first and second pinion assemblies, wherein the first pinion assembly is operatively connected between the first drive rack and first coupler gear and the second pinion assembly is operatively connected between the second drive rack and the second coupler gear such that linear movement of the first and second drive racks causes rotation of the first and second coupler gears around the coupler axis; and the first and second coupler gears are operatively connected to the second upper transfer gear and the second lower transfer gear, respectively, such that rotation of the first and second coupler gears around the coupler axis alters angular relationships between the first and second upper eccentric members and the first and second lower eccentric members.

13. A method of altering an angular relationship between at least upper and lower eccentric members of an eccentric system of a vibratory system, where the eccentric system comprises at least one transfer gear operatively connected to the at least upper and lower eccentric members, the method comprising the steps of:

providing a coupler housing defining a coupler axis;

supporting at least one drive rack for linear movement within the coupler housing;

arranging a coupler drive system to cause linear movement of the at least one drive rack within the coupler housing;

arranging at least one coupler gear to engage the at least one transfer gear;

operatively connecting at least one pinion assembly the at least one drive rack and the at least one coupler gear; and operating the coupler drive system such that linear movement of the at least one drive rack causes rotation of the at least one coupler gear around the coupler axis to alter the angular relationship between the upper and lower eccentric members.

14. A method as recited in claim 13, in which the vibratory system further comprises a housing structure, the method further comprising the step of arranging at least one bearing assembly to support the coupler housing for rotation relative to the housing structure.

15. A method as recited in claim 13, in which the vibratory system further comprises a housing structure, the method further comprising the step of arranging first and second bearing assemblies to support the coupler housing for rotation relative to the housing structure.

16. A method as recited in claim 13, further comprising the steps of:

supporting first and second drive pistons relative to the coupler housing to define first and second drive chambers; and introducing fluid into at least one of the first and second drive chambers to displace at least one of the first and second drive racks.

* * * * *